United States Patent
Toyoda

(10) Patent No.: US 7,322,883 B2
(45) Date of Patent: Jan. 29, 2008

(54) GAME MACHINE, SERVER, AND PROGRAM

(75) Inventor: Hirobumi Toyoda, Tokyo (JP)

(73) Assignee: ARUZE Co., Ltd. (JP)

( * ) Notice: Subject to any disclaimer, the term of this patent is extended or adjusted under 35 U.S.C. 154(b) by 755 days.

(21) Appl. No.: 10/457,025

(22) Filed: Jun. 9, 2003

(65) Prior Publication Data

US 2004/0063482 A1 Apr. 1, 2004

(30) Foreign Application Priority Data

Jun. 11, 2002 (JP) ............................ 2002-170578

(51) Int. Cl.
  *A63F 9/24* (2006.01)
(52) U.S. Cl. .......................... 463/11; 463/32
(58) Field of Classification Search ............ 463/18–20, 463/22, 26, 42; 273/85
  See application file for complete search history.

(56) References Cited

U.S. PATENT DOCUMENTS

| | | | | |
|---|---|---|---|---|
| 4,521,014 A * | 6/1985 | Sitrick | ...................... | 463/31 |
| 4,614,342 A | 9/1986 | Takashima | | |
| 5,221,083 A * | 6/1993 | Dote | ........................ | 463/32 |
| 5,428,528 A * | 6/1995 | Takenouchi et al. | .......... | 463/42 |
| 6,386,973 B1 | 5/2002 | Yoseloff | | |
| 2002/0010023 A1 | 1/2002 | Kusuda et al. | | |
| 2003/0144052 A1* | 7/2003 | Walker et al. | ................ | 463/20 |

FOREIGN PATENT DOCUMENTS

| | | |
|---|---|---|
| JP | 09-075505 | 3/1997 |
| JP | 10-216346 | 8/1998 |
| JP | 11-300034 | 11/1999 |
| JP | 2001-79140 | 3/2001 |
| JP | 2001-149524 | 6/2001 |
| JP | 2002-85790 | 3/2002 |
| JP | 2002-125161 | 4/2002 |
| JP | 2002-163407 | 6/2002 |
| JP | 2002-163721 | 6/2002 |
| JP | 2002-219206 | 8/2002 |
| JP | 2002-248201 | 9/2002 |
| JP | 2003-70956 | 3/2003 |
| JP | 2003-70957 | 3/2003 |
| JP | 2003-135733 | 5/2003 |
| JP | 2003-144726 | 5/2003 |
| JP | 2003-144742 | 5/2003 |

* cited by examiner

*Primary Examiner*—Robert E Pezzuto
(74) *Attorney, Agent, or Firm*—Antonelli, Terry, Stout & Kraus, LLP

(57) ABSTRACT

A game machine (10) is equipped with a display device (32), which displays a dealer image that performs the dealing of cards, and a plurality of display devices (52), each of which displays an information image on a card game. The card game is started based on loaded game media and disbursement of game media to be provided to players is performed in accordance with the results of the card game. With this game machine (10), when a card is dealt, a dealer image, which faces the direction in which a display device (52) to which the card is dealt is installed, is displayed on the display device (32). A game machine, with which the sensation of playing an actual game and with which the player to whom a card is dealt can be specified, is thus provided.

19 Claims, 16 Drawing Sheets

GAME MACHINE, SERVER, AND PROGRAM

FIELD OF THE INVENTION

This invention relates to a game machine that executes a card game, such as poker, etc., on a video screen.

RELATED ART

Game machines, of a type with which a card game, such as a poker game, etc., is executed on a video screen, are known since priorly. With this type of game machine, a specific number (typically, five) of cards are dealt to a player as the player's hand, and if a combination that is set as a winning combination is included in the player's hand, a fixed allotment is provided as the player's win.

Among such game machines, there are also known those of a large scale with which a poker game can be enjoyed by a plurality of players, and, for example, Japanese Unexamined Patent Publication No. Hei 11-300034 discloses a game machine that ascertains the psychological conditions of the players from the voices and movements of the players and provides an excellent interactive sensation.

With such a game machine, a plurality of individual display devices and a large-scale common display device, which displays a dealer image that deals cards to a plurality of players, are provided, a dealer is displayed on the common display device, and the cards dealt by the dealer are displayed on the individual display devices. By thus simulating a game in which a dealer and at least one player face each other and play a game, a face-to-face game unfolds as the processing of a priorly stored game program proceeds.

With this dealer image, when a card is dealt, a hand is displayed as if it is moved to deal the card. A more realistic game is thus provided.

However, with the above-described game machine, since the display during the dealing of a card is limited to a dealer image display in which a hand is moved, it cannot be readily identified to which player the card has been dealt. That is, since the tactical interaction among players of observing the expression of a player at the instant at which a card is dealt, etc., which is an enjoyable feature of card games, cannot be performed, a card game with a game machine was not only unrealistic but also could not be enjoyed in the same manner as an actual card game. In an actual card game, the winning or losing of the card game can be affected by tactics, such as the observation of the expression of a player at the instant at which a card is dealt.

In particular, in a card game, such as poker, etc., in which the game progresses with the cards that have been dealt to each of a plurality of players not being shown to other players, though a player can recognize definitely which cards have been distributed to him/herself, it is not easy to recognize which of the other players cards have been dealt to, and in some cases, it cannot even be recognized whether or not a card has been dealt.

This invention has been made in view of the above-described problem and an object thereof is to provide a game machine with which the feeling of playing an actual card game can be obtained and the players to whom cards have been dealt can be specified.

SUMMARY OF THE INVENTION

In order to achieve the above object, with this invention's game machine, when a card is dealt, an image, which is correlated with the position at which an individual display part to which the card is dealt, is displayed on a common display part.

More specifically, this invention provides arrangements such as the following.

(1) A game machine comprising: a common display part, displaying a dealer image that performs the dealing of cards; a plurality of individual display parts, each displaying an information image of a card game; a display control means, controlling the above-mentioned common display part and the above-mentioned individual display parts; and a disbursement means, enabled to perform the disbursement of game media to be provided to players in accordance with the results of a card game that is, started based on loaded game media; wherein, when the dealing of a card is performed, the above-mentioned display control means makes the dealer image be displayed on the above-mentioned common display part in a manner such that the dealer image faces the direction in which the above-mentioned individual display part to which the card is dealt is installed.

With the invention of (1), since when the dealing of a card is performed, the above-mentioned display control means makes the dealer image be displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of increasing the possibility of making players become immersed in the game is increased. Needless to say, a realistic game can be enjoyed by both players to whom a card is not dealt and the player to whom the card is dealt. Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games.

The dealer image may be displayed in a manner such that, when a card is dealt, a hand of the dealer is positioned in the direction in which an above-mentioned individual display part to which the card is dealt is installed, and with such an arrangement, an even more realistic game, can be provided and players can be provided with the enjoyment of the tactical interaction that is characteristic of card games.

(2) A game machine comprising: a common display part, displaying a dealer image that performs the dealing of cards; and a plurality of individual display parts, each displaying an information image of a card game; and with which a card game is started based on loaded game media and the game media can be disbursed to players in accordance with the results of the card game, wherein when the dealing of a card is performed, the above-mentioned display control means makes the dealer image be displayed on the above-mentioned common display part in a manner such that the dealer image faces the direction in which the above-mentioned individual display part to which the card is dealt is installed.

With the invention of (2), since when the dealing of a card is performed, the dealer image is displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of making players become immersed in the game is increased. Needless to say, a realistic game can be enjoyed by both players to whom a card is not dealt and the player to whom the card is dealt. Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games.

The dealer image may be displayed in a manner such that, when a card is dealt, a hand of the dealer is positioned in the direction in which an above-mentioned individual display part to which the card is dealt is installed, and with such an arrangement, an even more realistic game can be provided and players can be provided with the enjoyment of the tactical interaction that is characteristic of card games.

(3) The game machine as set forth in (1) above, wherein in some cases in making the dealer image be displayed on the above-mentioned common display part in a manner such that the dealer image deals a card, the above-mentioned display control means makes the dealer image displayed on the above-mentioned common display part be displayed in a manner such that a hand of the dealer image is erased and makes the hand of the dealer image be displayed on the above-mentioned individual display part to which the above-mentioned card is dealt.

With the invention of (3), since in some cases in making the dealer image be displayed on the above-mentioned common display part in a manner such that the dealer image deals a card, the above-mentioned display control means makes the dealer displayed on the above-mentioned common display part be displayed in a manner such that a hand of the dealer image is erased and makes the hand of the dealer image be displayed on the above-mentioned individual display part to which the above-mentioned card is dealt, a player to whom a card is dealt is provided with a sensation of actually being dealt a card, thus providing a game that is even more realistic.

Also, by providing an arrangement equipped with a held card display part, disposed at a position visible to the players, and arranging so that the above-mentioned display control means, in some cases in making the dealer image be displayed on the above-mentioned common display part in a manner such that the dealer image deals a card, makes the dealer image displayed on the above-mentioned common display part be displayed in a manner such that a hand of the dealer image is erased and makes the hand of the dealer image be displayed on the above-mentioned individual display part to which the above-mentioned card is dealt, a player to whom the card is not dealt can observe how the player to whom the card is dealt reacts upon visibly recognizing the card and can thus enjoy the tactical interaction that is characteristic of card games.

Besides such a game machine, this invention may also be provided in the form of a server and a program.

(4) A server for controlling game machines, each comprising a common display part, displaying a dealer image that performs the dealing of cards, and a plurality of individual display parts, each displaying an information image of a card game, and with each of which a card game is started based on the loaded game media and the game media to be provided to players can be disbursed in accordance with the results of the card game, wherein, when the dealing of a card is performed, the dealer image be displayed on the common display part of an above-mentioned game machine in a manner such that the dealer image faces the direction in which the above-mentioned individual display part to which the card is dealt is installed.

With the invention of (4), since when the dealing of a card is performed, the dealer image is displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of making players become immersed in the game is increased. Needless to say, a realistic game can be enjoyed by both players to whom a card is not dealt and the player to whom the card is dealt. Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games.

Furthermore, the possibility of centralized control of game machines from a remote location is provided, and the above-mentioned effects can be obtained without having to perform settings and other troublesome tasks for each of the game machines.

The dealer image may be displayed in a manner such that, when a card is dealt, a hand of the dealer is positioned in the direction in which an above-mentioned individual display part to which the card is dealt is installed, and with such an arrangement, an even more realistic game can be provided and players can be provided with the enjoyment of the tactical interaction that is characteristic of card games.

(5) A program for making a computer execute for a game machine, which comprises a common display part, displaying a dealer image that performs the dealing of cards, and a plurality of individual display parts, each displaying an information image of a card game: a display control step of controlling the above-mentioned common display part and the above-mentioned individual display parts; and a disbursement step, in which the disbursement of game media to be provided to players can be performed in accordance with the results of a card game that is started based on the loaded game media; wherein, when the dealing of a card is performed, the computer execute, for the above-mentioned game machine, a step of making the dealer image be displayed on the above-mentioned common display part in a manner such that the dealer image faces the direction in which the above-mentioned individual display part to which the card is dealt is installed.

With the invention of (5), since when the dealing of a card is performed, the computer is made to execute, for the above-mentioned game machine, a step of making the dealer image be displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of increasing the possibility of making players become immersed in the game is increased. Needless to say, a realistic game can be enjoyed by both players to whom a card is not dealt and the player to whom the card is dealt. Also, virtual players controlled by a computer may be included among the players.

Among such card games, this program is effective especially for a card game, such as a poker game, etc., with which the game progresses without letting not even a single card among one's hand be seen by other players. Since even players to whom cards are not dealt are able to recognize more readily to which players cards are dealt and when cards are dealt and are thus able to enjoy the tactical interaction that is characteristic of card games, a realistic game can be provided.

Also, such a program may be readable by a computer and may be stored in a storage medium of a game machine itself or a server, etc. Furthermore, such a program may be stored in a storage medium incorporated in equipment of another arrangement or may be stored in a divided manner in storage media incorporated in a game machine and a server.

The dealer image may be displayed in a manner such that, when a card is dealt, a hand of the dealer is positioned in the direction in which an above-mentioned individual display part to which the card is dealt is installed, and with such an arrangement, an even more realistic game can be provided and players can be provided with the enjoyment of the tactical interaction that is characteristic of card games.

Other features and advantages of the invention will be apparent from the following description taken in connection with the accompanying drawings.

PREFERRED EMBODIMENTS OF THE INVENTION

Preferred embodiments of this invention shall now be described based on the drawings. Though with the embodiments described below, cases where this invention is applied to a game machine for performing a poker game shall be described as preferred embodiments of this invention's game machine, this invention is suited not only to a poker game but to any card game with which there is a dealer, such as a blackjack game, a Japanese flower card game, etc., and is especially favorable for games, among such games, with which cards are faced away from other players.

[Arrangement of a Game Machine]

Figure 1:
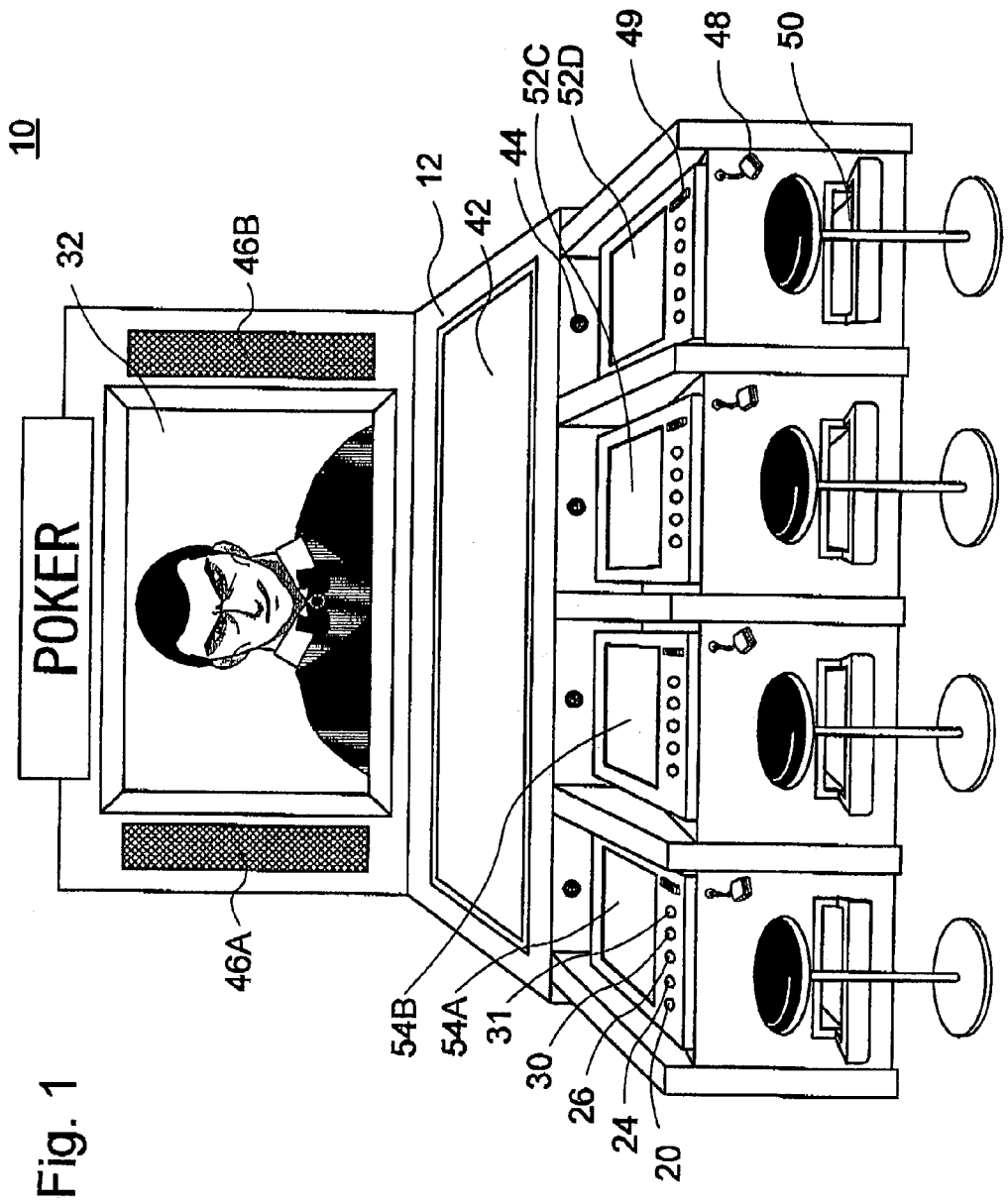
FIG. 1 is a front view showing the general appearance of a game machine according to this invention.

FIG. 1 is a front view showing the general appearance of a game machine 10. Though game machine 10 is a game machine that enables playing by use of coins, medals, tokens or other form of game currency or a card, etc., which stores information on the game currency provided or is to be provided to a player, in the following description, it shall be deemed that medals are used.

A dealer display device 32 is equipped on the front face of a casing 12 that forms the entirety of game machine 10. A dealer screen, in which a dealer who deals cards is drawn, is displayed on dealer display device 32. This dealer deals cards to individual display devices 52 to be described later.

A speaker 46 (46A or 46B) is equipped at each side of dealer display device 32 and emits effect sounds, such as the voice emitted by the dealer, background music, etc.

Furthermore, a card dealing display device 42 is equipped on the upper face of casing 12 and cards, etc., dealt by the dealer image are displayed facedown. Medal images, indicating the numbers of medals betted by the respective players, are also displayed. Though with game machine 10 of this embodiment, display device 42 is equipped and the exchange of cards is made known clearly to other players by display of cards facedown on display device 42, this invention is not limited thereto and there is no problem in providing an arrangement that is not equipped with display device 42.

Furthermore, player display devices 52 (52A to 52D), each of which can be recognized visually by a player, is equipped in front of the casing, and these are aligned at positions opposing display device 42. On each display device 52, cards that have been dealt to the corresponding player from the dealer image are displayed faceup. The number of medals bet by each player, the number of medals credited to each player, and as shall be described below, taken images of the other players, etc., are displayed as well. Also as shall be described later, each display device 52 is equipped with a touch sensor 28 (28A to 28D) (see FIG. 2) and the game progresses in accordance with the operations of the players.

The above-described "display device 32" corresponds to making up a part of a common display part on which a dealer image that performs the dealing of cards is displayed. Furthermore, "display devices 52" correspond to making up a part of the plurality of individual display parts on each of which is displayed an information image of a card game.

The parts of the above-described display devices 32, 42, and 52, which display the effect images to be described below, may be arranged from liquid crystal displays, cathode ray tubes, etc. Also, though with the above-described embodiment, display devices 32, 42, and 52 are indicated as being provided in casing 12 of game machine 10, display devices 32, 42, and 52 may be disposed at any positions of the game machine as long as the players can see the display devices.

Also though with game machine 10 of this embodiment, display devices 52 are disposed side-by-side with respect to display device 32, this invention is not limited thereto, and display devices 52 may be arranged in a substantially semi-circular shape centered about the center of display device 32.

Furthermore, various operation switches are equipped near each display device 52, and specifically, these include an entry switch 20, a bet switch 24, a card exchange switch 26, a stop switch 30, and a disbursement switch 31. A player operates these switches to make the game progress.

Though with regard to the above-mentioned operation switches, this embodiment includes entry switch 20, bet switch 24, card exchange switch 26, stop switch 30, and disbursement switch 31, this invention is not limited thereto and other switches may be provided, and furthermore, the switches do not have to be those that are operable by pressing but may be operating members that are operable by rotation, etc. Also, though with this embodiment, the card selection operation is executed by means of the above-described touch sensor 28, this invention is not limited thereto and other operation switches may be used instead, and yet furthermore, the above-mentioned switches do not have to be provided and operations may be enabled by use of a touch sensor, etc., instead.

Also, a medal slot 49 (49A to 49D) is equipped near these operation buttons, and the number of medals loaded from medal slot 49 is counted by a medal detection sensor 22 (22A to 22D) (see FIG. 2) equipped inside medal slot 49.

An image taking device 44 (44A to 44D) is equipped in front of each display device 52 and this takes the image of the expression of the corresponding player and makes the taken image be displayed on display devices 52 that are visible to the other players.

Portable terminal device connection connectors 48, enabling connection with a portable telephone or other portable terminal device, are equipped at lower parts of the side face of casing 12, and by connecting a portable telephone or other portable terminal device to a portable terminal device connection connector 48, not only can chatting with other players be enjoyed but tactical interaction among players can also be enjoyed. Needless to say a player may pretend to be chatting with another player and thereby perform tactical interaction with other players.

Furthermore, medal ejection slots 50 are equipped at lower parts of the side face of casing 12, and from these are ejected medals disbursed by disbursement devices 54 (54A to 54D), each of which is installed inside a medal ejection slot 50 and includes a hopper drive circuit, etc. This "disbursement device 54" corresponds to making up a part of a "disbursement means."

[Arrangement of the Control Part of the Game Machine]

Figure 2:
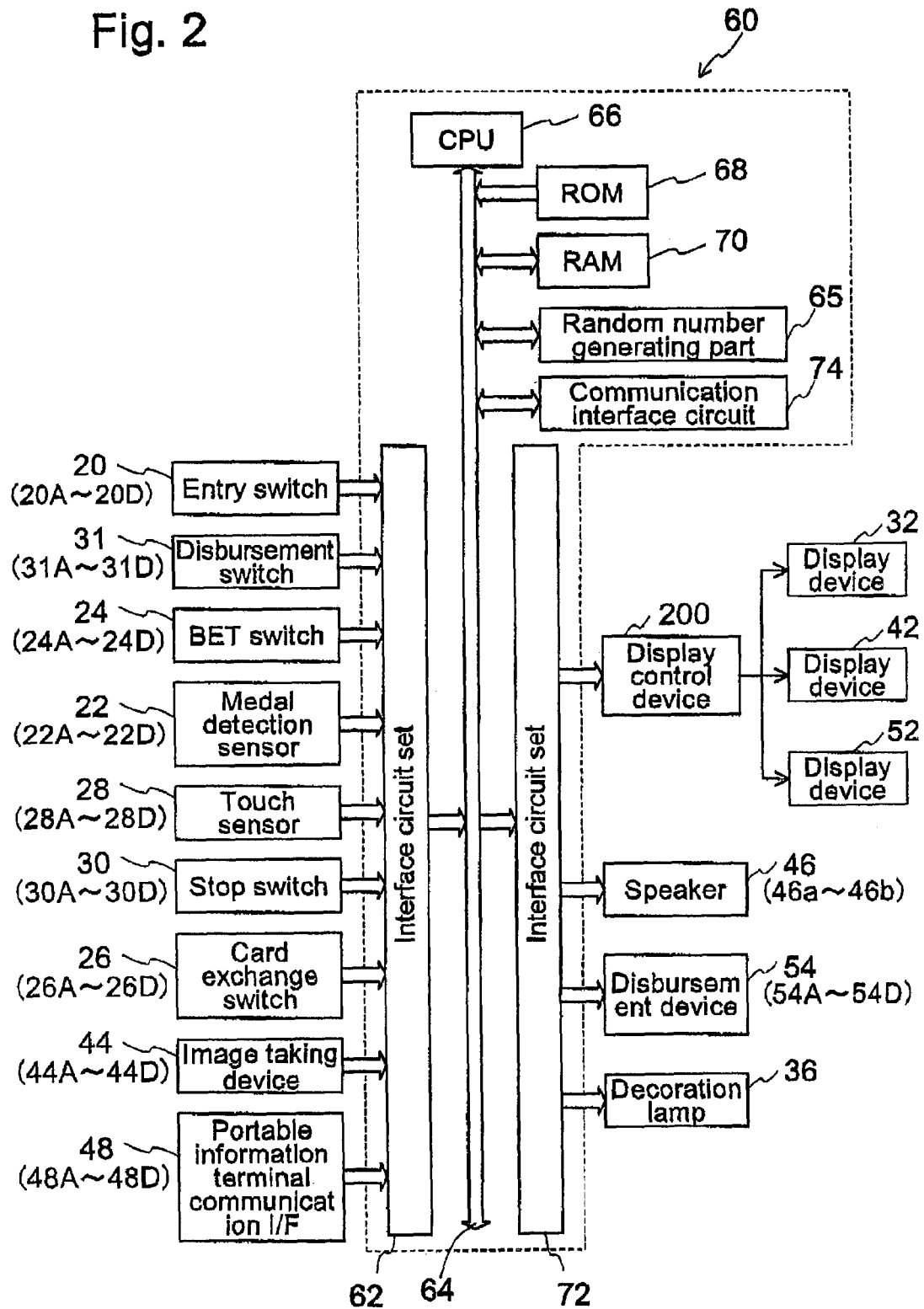
FIG. 2 is a block diagram showing a main control circuit of a game machine, which is an embodiment of this invention.

FIG. 2 shows a block diagram of a control circuit of a game machine of this invention's embodiment.

A main control circuit 60 includes a CPU 66, which performs control operations based on a program set in advance, and ROM 68 and RAM 70, which are storage means.

Furthermore, main control circuit 60 is equipped with interface circuit sets 62 and 72, an input/output bus 64, a random number generating part 65, and a communication interface 74, which shall be described below.

Input/output bus 64 is arranged for input and output of data signals or address signals to and from a central processing unit (referred to hereinafter as "CPU") 66, and inside CPU 66, a timer (not shown), to be described below, is equipped.

"CPU 66" corresponds to making up parts of a "display control means" and the "disbursement means," which are described in the claims.

The above-mentioned ROM 68 stores a control program that controls the flow of the entirety of the game of the game machine. ROM 68 furthermore stores initial data for executing control programs, a program for controlling the blinking operation pattern of a decoration lamp 36, a program that performs display control of display device 32, etc.

Specifically, the following programs are included among the programs in the present embodiment.

(A) A program, which makes a computer execute a display control step of controlling the above-mentioned common display part and the above-mentioned individual display parts.

(B) A program, which makes a computer execute a disbursement step of enabling disbursement of game media to be provided to players in accordance with the results of the card game that is started based on the loaded game media.

Besides (A) and (B), there is also a program, which, when the dealing of a card is performed, makes a computer execute, for the above-mentioned game machine, a step of making the dealer image be displayed on the above-mentioned common display part in a manner such that the dealer image faces the direction in which the above-mentioned individual display part to which the card is dealt is installed.

"ROM 68" corresponds to making up parts of the "display control means" and the "disbursement means" described in the claims.

With these programs, since when the dealing of a card is performed, the computer is made to execute, for the above-mentioned game machine, a step of making the dealer image be displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of increasing the possibility of making players become immersed in the game is increased. Needless to say, a realistic game can be enjoyed by both players to whom a card is not dealt and the player to whom the card is dealt. Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games.

Also, such a program may be readable by a computer and may be stored in a storage medium of a game machine itself or a server, etc. Furthermore, such a program may be stored in a storage medium incorporated in equipment of another arrangement or may be stored in a divided manner in storage media incorporated in a game machine and a server.

The dealer image may be displayed in a manner such that, when a card is dealt, a hand of the dealer is positioned in the direction in which an above-mentioned individual display part to which the card is dealt is installed, and with such an arrangement, an even more realistic game can be provided and players can be provided with the enjoyment of the tactical interaction that is characteristic of card games.

Though the programs in this embodiment are stored in ROM 68, they may be recorded in a hard disk device, CD-ROM, DVD, or other storage medium instead. These programs do not have to be recorded in advance and may be recorded in RAM 70, etc., after the power is turned on. Furthermore, each of the programs may be recorded in a separate storage medium.

The above-mentioned RAM 70 stores the values of flags and variables used in the above-described programs.

"RAM 70" corresponds to making up parts of the "display control means" and the "disbursement means" described in the claims.

Each of the above-mentioned entry switches 20 is connected to interface circuit set 62, and when pressed by the operation of a player, supplies an entry signal to interface circuit set 62. Upon receiving the entry signal, interface circuit set 62 converts the entry signal into entry data of predetermined form and supplies the entry data to CPU 66 via input/output bus 64.

Each of the above-mentioned disbursement switches 31 is also connected to interface circuit set 62, and when pressed by the operation of a player, supplies a disbursement signal to interface circuit set 62, and upon receiving the disbursement signal, interface circuit set 62 converts the disbursement signal into disbursement data of predetermined form and supplies the disbursement data to CPU 66 via input/output bus 64.

Furthermore, each of the above-mentioned bet switches 24 is also connected to interface circuit set 62, and when pressed by the operation of a player, supplies a single bet signal to interface circuit set 62, and upon receiving the single bet signal, interface circuit set 62 converts the single bet signal into single bet data of predetermined form and supplies the single bet data to CPU 66 via input/output bus 64.

Yet furthermore, each of the above-mentioned medal detection sensors 22 is also connected to interface circuit set 62, and when a medal loaded from medal slot 49 by a player is detected, supplies a loading detection signal to interface circuit set 62, and upon receiving the loading detection signal, interface circuit set 62 converts the loading detection signal into loading detection data of predetermined form and supplies the loading detection data to CPU 66 via input/output bus 64.

Yet furthermore, each of the above-mentioned touch sensors 28 is also connected to interface circuit set 62, and when touched by a hand of a player, supplies a touch detection signal, which indicates the location of the touch, to interface circuit set 62, and upon receiving the touch detection signal, interface circuit set 62 converts the touch detection signal into touch detection data of predetermined form and supplies the touch detection data to CPU 66 via input/output bus 64.

Yet furthermore, each of the above-mentioned stop switches 30 is also connected to interface circuit set 62, and when pressed by the operation of a player, supplies a stop signal to interface circuit set 62, and upon receiving the stop signal, interface circuit set 62 converts the stop signal into stop data of predetermined form and supplies the stop data to CPU 66 via input/output bus 64.

Yet furthermore, each of the above-mentioned card exchange switches 26 is also connected to interface circuit set 62, and when pressed by the operation of a player, supplies a card exchange signal, indicating the card to be exchanged, to interface circuit set 62, and upon receiving the card exchange signal, interface circuit set 62 converts the card exchange signal into card exchange data of predetermined form and supplies the card exchange data to CPU 66 via input/output bus 64.

Yet furthermore, each of the above-mentioned image taking devices 44 is also connected to interface circuit set 62, and constantly supplies image signals to interface circuit set 62 while the power is turned on, and upon receiving the image signals, interface circuit set 62 converts the image signals into image data of predetermined form and supplies the image data to CPU 66 via input/output bus 64.

Yet furthermore, each of the above-mentioned portable terminal device connection connectors 48 is connected to interface circuit set 62, and by connecting a portable telephone or other portable terminal device to a portable terminal device connection connector 48, not only can chatting with other players be enjoyed but tactical interactions among players can also be enjoyed. Needless to say a player may pretend to be chatting with another player and thereby perform tactical interaction with other players. Each portable terminal device connection connector 48 constantly supplies character communication signals to interface circuit set 62 while a portable terminal device is connected, and upon receiving the character communication signals, interface circuit set 62 converts the character communication signals into character communication data of predetermined form and supplies the character communication data to CPU 66 via input/output bus 64.

Also, the above-mentioned random number generating part 65 is connected to input/output bus 64 and supplies the generated random numbers to CPU 66 via input/output bus 64. When an instruction for generating a random number is issued from CPU 66 to random number generating part 65, random number generating part 65 generates a random number within a predetermined range and supplies a signal indicating the value of this random number via input/output bus 64 to CPU 66. CPU 66 determines the condition of progress of the game from this generated random number.

Though game machine 10 of the present embodiment is equipped with a random number generating part 65 that generates random numbers, this invention is not limited thereto, and CPU 66 itself may be arranged to generate random numbers instead of providing random number generating part 65 in particular, or random number generating part 65 may be equipped and CPU 66 may be arranged to generate internal lottery data based on the random numbers generated by random number generating part 65.

Furthermore, communication interface circuit 74 is connected to input/output bus 64, and as shall be described below, is provided for performing communication with a server 80, etc., via a public telephone line network, local area network (LAN), or other communication line.

Furthermore, an interface circuit set 72 is also connected to input/output bus 64. Speakers 46, decoration lamp 36, and disbursement devices 54 are connected to interface circuit set 72, and interface circuit set 72 supplies drive signals, drive power, and various signals to control each of the above-mentioned devices in accordance with the results of computational processes performed at CPU 66.

Yet furthermore, display control device 200 is also connected to interface circuit set 72, and based on an image display instruction generated from main control circuit 60, display control device 200 generates drive signals for driving the display devices 32, 42, and 52 connected to display control device 200. This "display control device 200" corresponds to making up a part of the "display control means." Though game machine 10 of this embodiment is arranged to be equipped with display control device 200, this invention is not limited thereto, and there is no problem with an arrangement, wherein display control device 200 is not equipped and CPU 66, etc. are made to perform all image display processes.

[Arrangement of the Display Control Device of the Game Machine]

Figure 3:
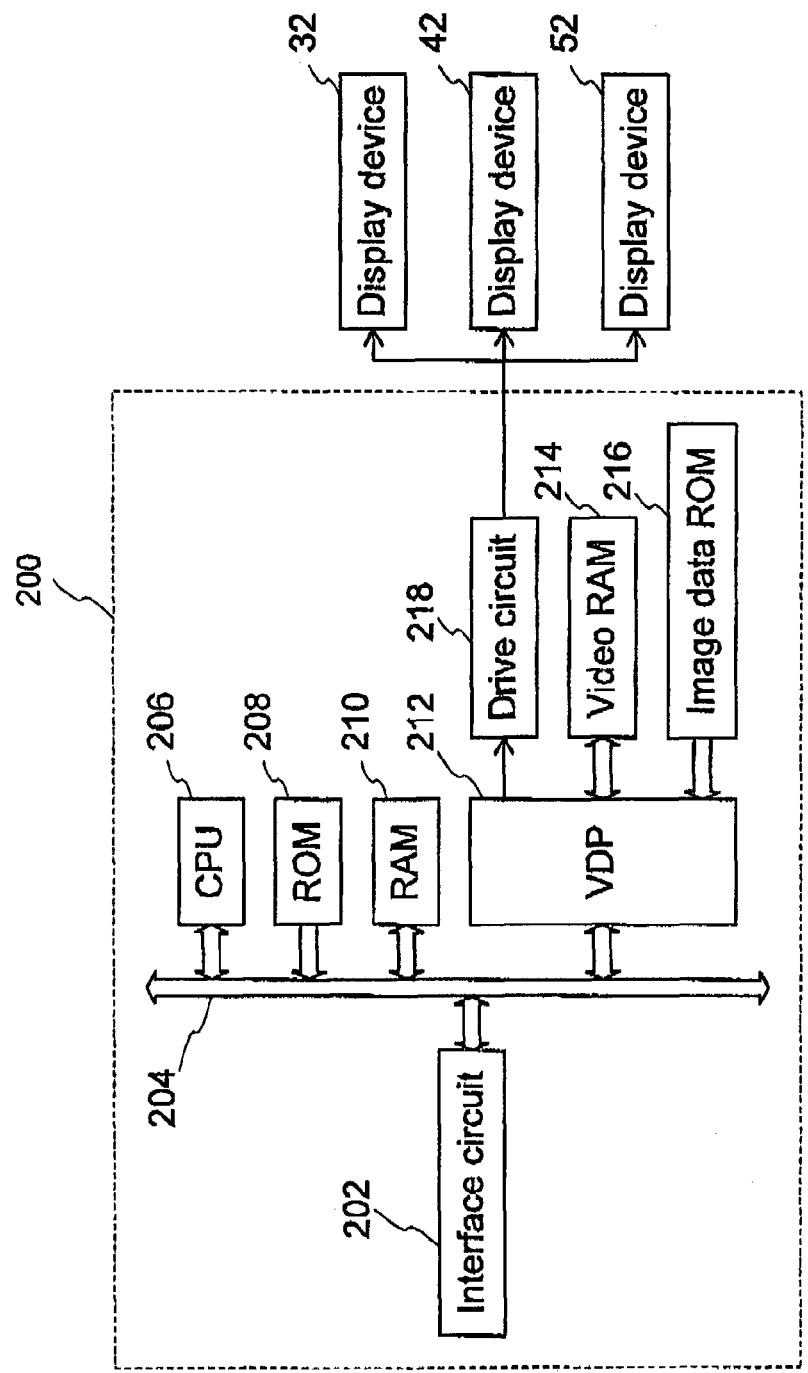
FIG. 3 is a block diagram showing a display control device of a game machine, which is an embodiment of this invention.

FIG. 3 shows a block diagram showing the circuit of the above-mentioned display control device 200.

An interface circuit 202 is connected to an input/output bus 204, and an image display instruction generated from the above-mentioned main control circuit 60 is supplied via interface circuit 202 to input/output bus 204. Input/output bus 204 is arranged to input and output data signals or address signals to and from a central processing unit (referred to hereinafter as "CPU") 206.

A ROM (read only memory) 208 and a RAM (random access memory) 210 are also connected to the above-mentioned input/output bus 204. ROM 208, stores a display control program for generating drive signals to be supplied to display device 32 based on image display instructions generated from main control circuit 60. Meanwhile, RAM 210 stores the values of the flags and variables used in the above-mentioned program.

Furthermore, an image data processor (referred to hereinafter as "VDP") 212 is also connected to input/output bus 204. This VDP 212 includes a so-called sprite circuit, a screen circuit, and a palette circuit, and is a processing device that can perform various processes for making display device 32 display images.

To the above-mentioned VDP 212 are connected a video RAM 214, for storing image data in accordance with image display instructions generated from main control circuit 60, and an image data ROM 216, for storing background image data, card image data, character image data, other image data and the like. A drive circuit 218, which generates drive signals for driving display device 32, is also connected to VDP 212.

By reading and executing the display control program stored in ROM 208, the above-mentioned CPU 206 stores, in video RAM 214, the image data to be displayed on display device 32 in accordance with image display instructions generated from main circuit 60. The image display instructions generated from main control circuit 60 include a player display instruction, background display instruction, card display instruction, character figure display instruction, and other display instructions.

As mentioned above, image data ROM 216 stores card image data, character figure image data of animated objects and other character figures displayed for an effect screen, background image data, which make up the backgrounds of display devices 32, 42, and 52, other image data.

The above-mentioned design image data are used to perform a change or stop of the design displays on display device 32, 42, and 52, and include image data corresponding to a variety of display modes, for example, magnified images, reduced images, deformed images, etc. The above-mentioned character figure image data include image data necessary for displaying modes in which a character figure performs a series of operations.

Figure 4:
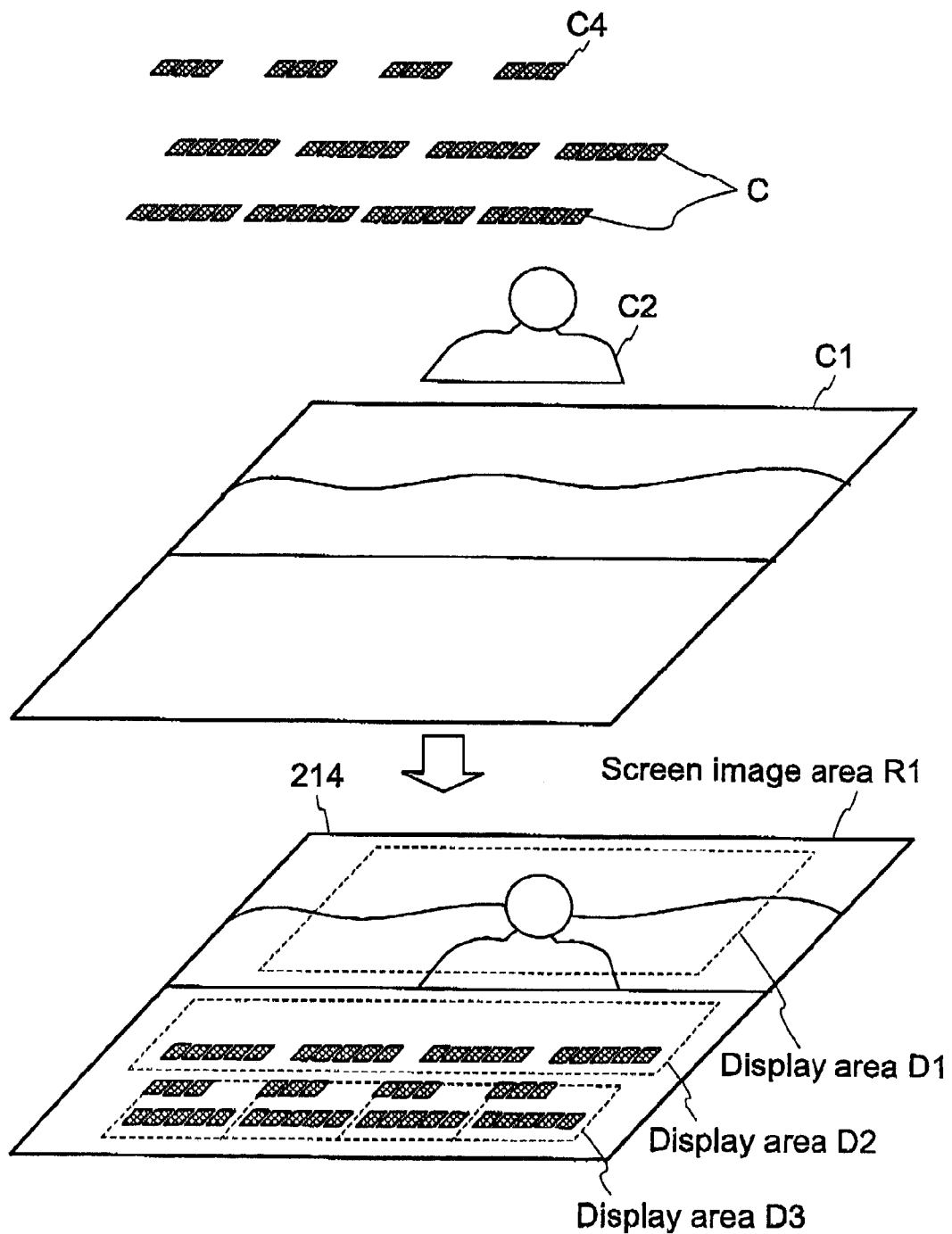
FIG. 4 is a schematic view illustrating an outline of the layout of image data in a video RAM of the display control device.

FIG. 4 shows a schematic view, illustrating an outline of the image data generated by the above-described video RAM 214.

As shown in FIG. 4, the size of the image data (referred to hereinafter as "screen image area R1"), generated by video RAM 214 in accordance with an image display instruction, is set to be greater than the display areas R2, R3, and R4 displayed on display devices 32, 42, and 52. In FIG. 4, screen display area R1 is indicated as an area that is surrounded by solid lines and display areas R2, R3, and R4 are indicated as areas surrounded by broken lines. By this setting, images to be displayed on display devices 32, 42, and 52 can be displayed smoothly as shall be described below. The image data to be displayed on display device 32 corresponds to display area R2, the image data to be displayed on display device 42 corresponds to display area R3, and the image data to be displayed on each display device 52 corresponds to display area R4, When a background display instruction is issued from main control circuit 60, VDP 212 reads the image data of image C1, which shows a design that is an identification information image, from image data ROM 216 and then positions the read image data at positions in video RAM 214 that correspond to the positions at which background images are to be displayed on display devices 32, 42, and 52.

Also, when a character figure display instruction is issued from main control circuit 60, VDP 212 reads the image data of a character figure image C2 from image data ROM 216 and then positions the read image data at a position in video RAM 214 that corresponds to the position at which the character figure image is to be displayed on display device 32.

Furthermore, when a card display instruction is issued from main control circuit 60, VDP 212 reads the image data of card images C3 from ROM 216 and then positions the read image data at positions in video RAM 214 that correspond to the positions at which the card images are to be displayed on display devices 42 and 52.

Yet furthermore, when a player display instruction is issued from main control circuit 60, VDP 212 reads the image data of player images C4 from RAM 210 and then positions the read image data at positions in video RAM 214 that correspond to the positions at which the player images are to be displayed on display devices 52.

In addition to the background image data, character figure image data, card image data, and player image data shown in FIG. 4, various instructions also exist for character string image data, betted coin image data, etc., to enable the display of character string images, betted coin images, etc.

After generating image data in video RAM 214, VDP 212 reads just the image data stored in display areas R2, R3, and R4 from video RAM 214, and supplies these as display signals to drive circuit 218. And as mentioned above, by displaying images one frame at a time and changing the display positions of the images, the dealer image is displayed as if it is moving or dealing a card, etc.

Also, synchronization among the images displayed on display devices 32, 42, and 52 may be carried out, that is, for example, when a hand of a dealer image displayed on display device 32 moves outside the display area, the image data expressing the hand of the dealer are positioned in display areas R3 and R4 so that the hand will be displayed in a synchronized manner on display devices 42 and 52.

[Display Examples of Images]

Figure 8:
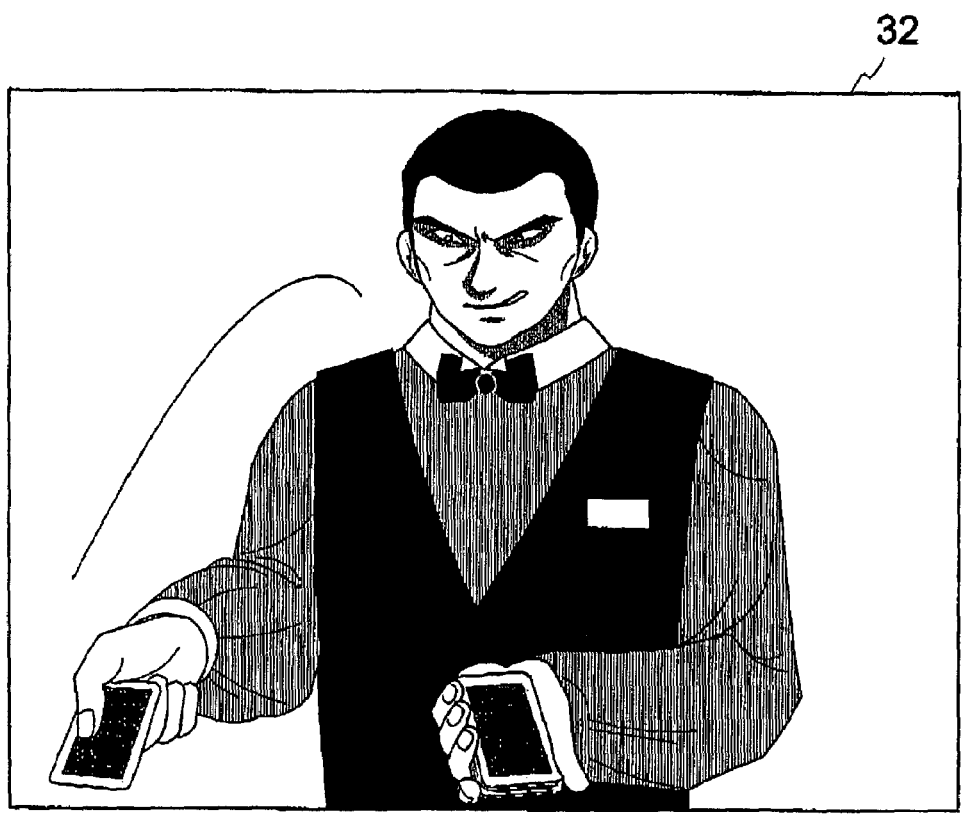
FIG. 8 is a schematic view showing a screen display of the game machine according to this invention.
Figure 9:
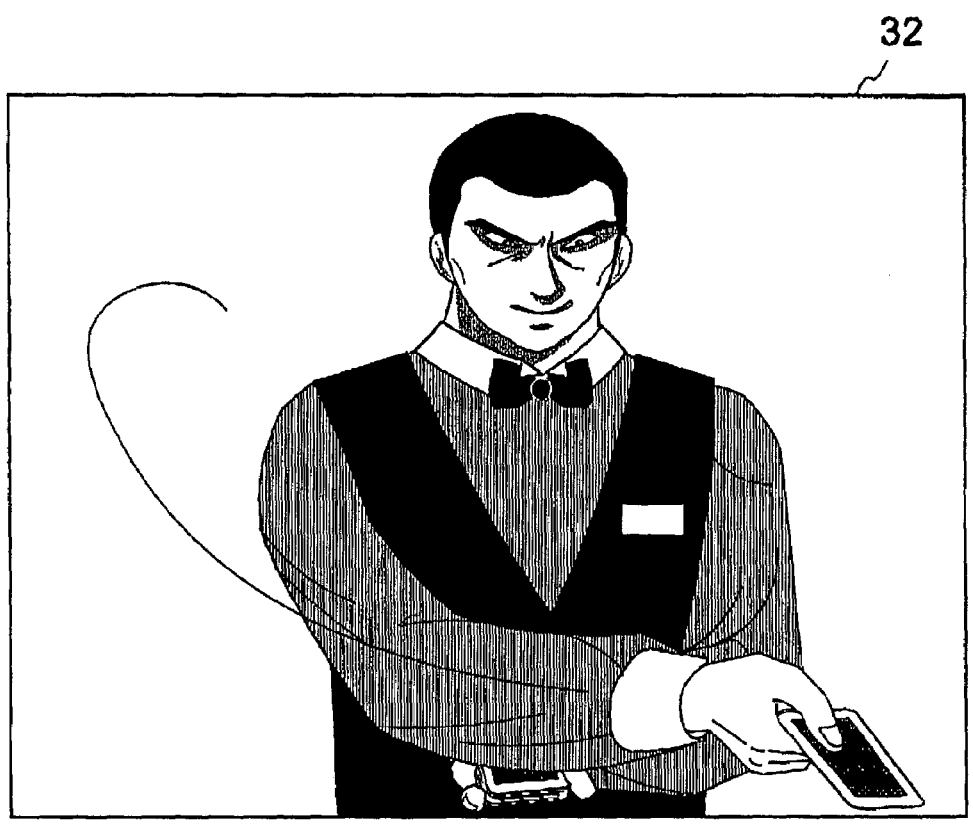
FIG. 9 is a schematic view showing a screen display of the game machine according to this invention.
Figure 10:
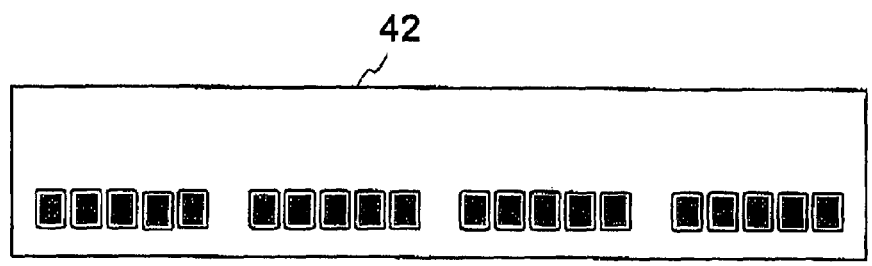
FIG. 10 is a schematic view showing a screen display of the game machine according to this invention.
Figure 11:
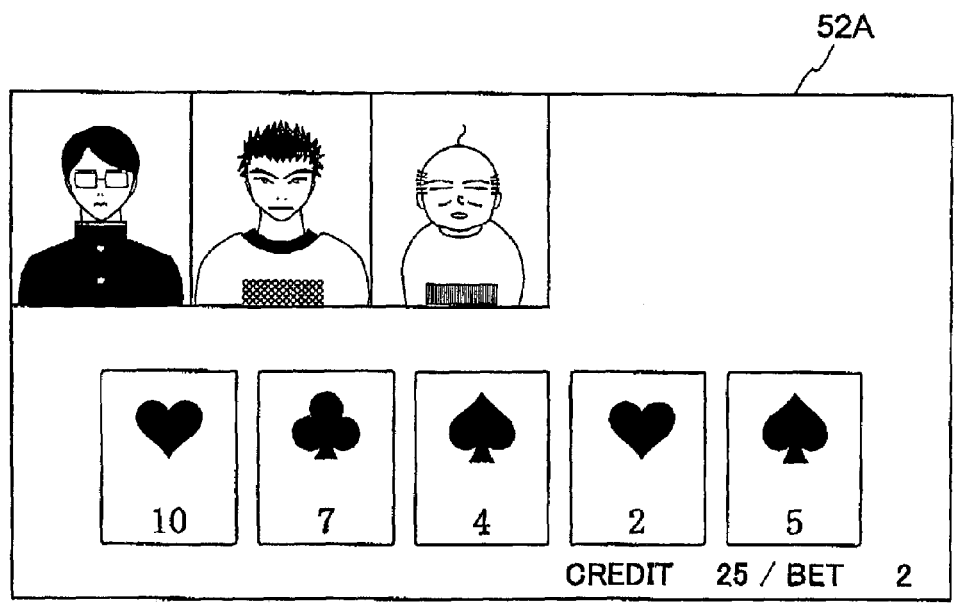
FIG. 11 is a schematic view showing a screen display of the game machine according to this invention.
Figure 12:
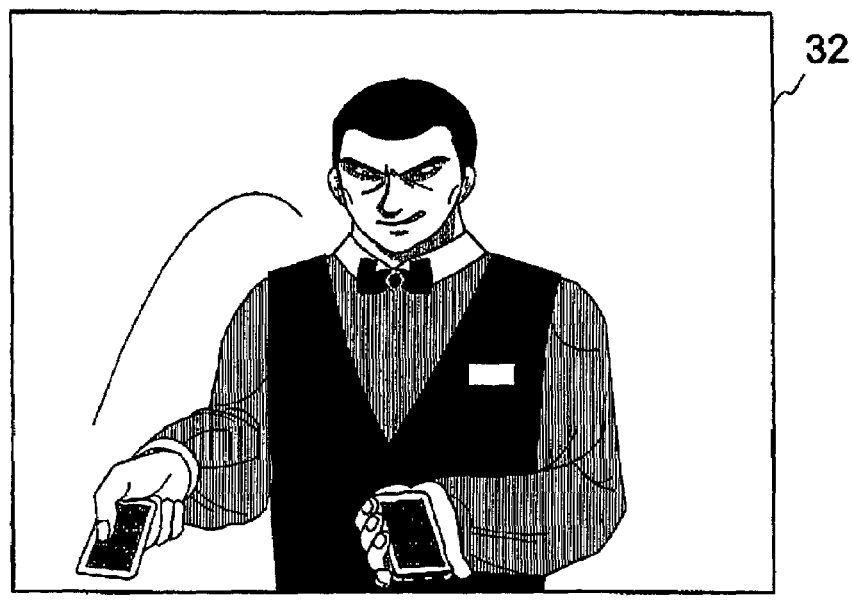
FIG. 12A is a schematic view showing a screen display of the game machine according to this invention.
FIG. 12B is a schematic view showing a screen display of the game machine according to this invention.
FIG. 12C is a schematic view showing a screen display of the game machine according to this invention.
Figure 12:
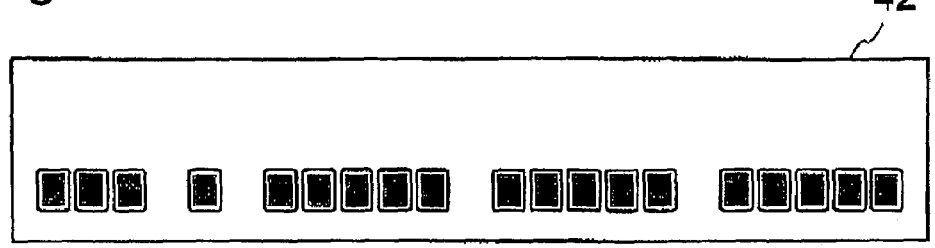
Figure 12:
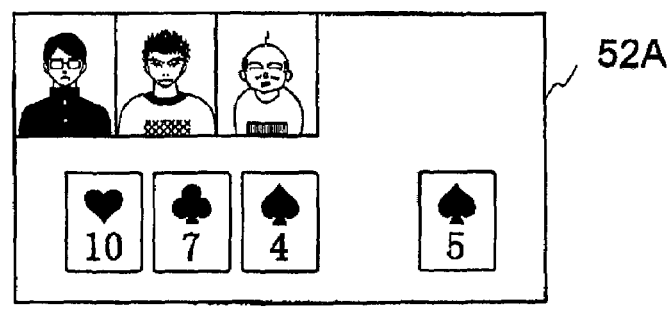
Figure 13:
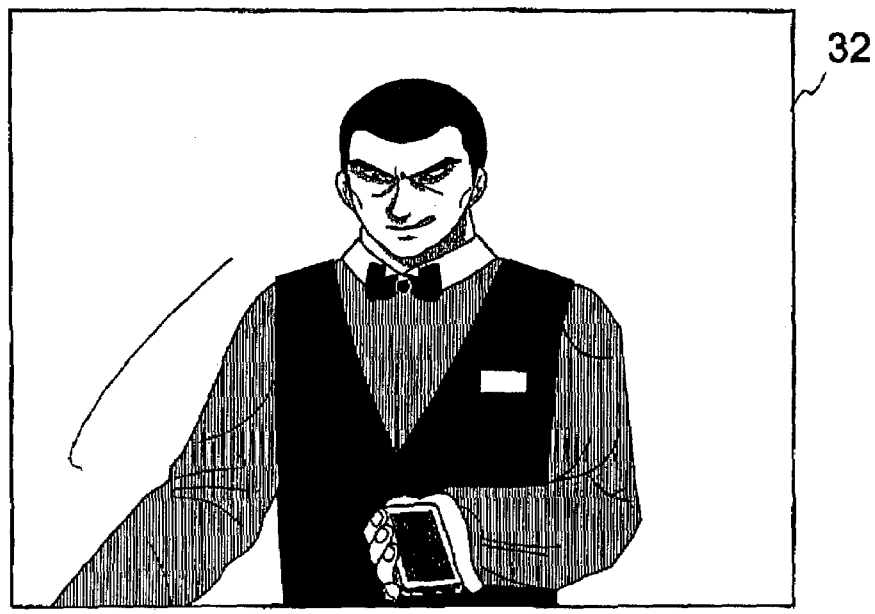
FIG. 13A is a schematic view showing a screen display of the game machine according to this invention.
FIG. 13B is a schematic view showing a screen display of the game machine according to this invention.
FIG. 13C is a schematic view showing a screen display of the game machine according to this invention.
Figure 13:
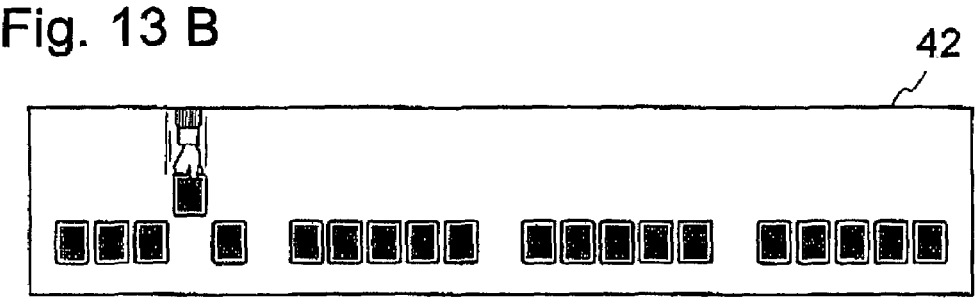
Figure 13:
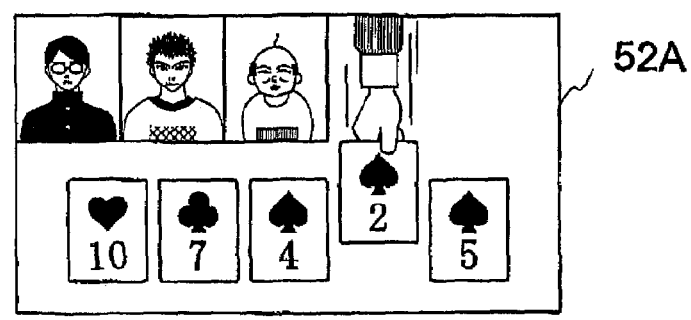

As described above, a game is made to proceed by images being displayed on display devices 32, 42, and 52 by the recording of image data in video RAM 214. Display examples of images displayed on display device 32 in this game are shown in FIGS. 5 through 9, a display example of an image displayed on display device 42 is shown in FIG. 10, and a display example of an image displayed on display device 52 is shown in FIG. 11. Also, display examples of images displayed on display devices 32, 42, and 52 are shown in FIGS. 12A, 12B, and 13A through 13C.

Figure 5:
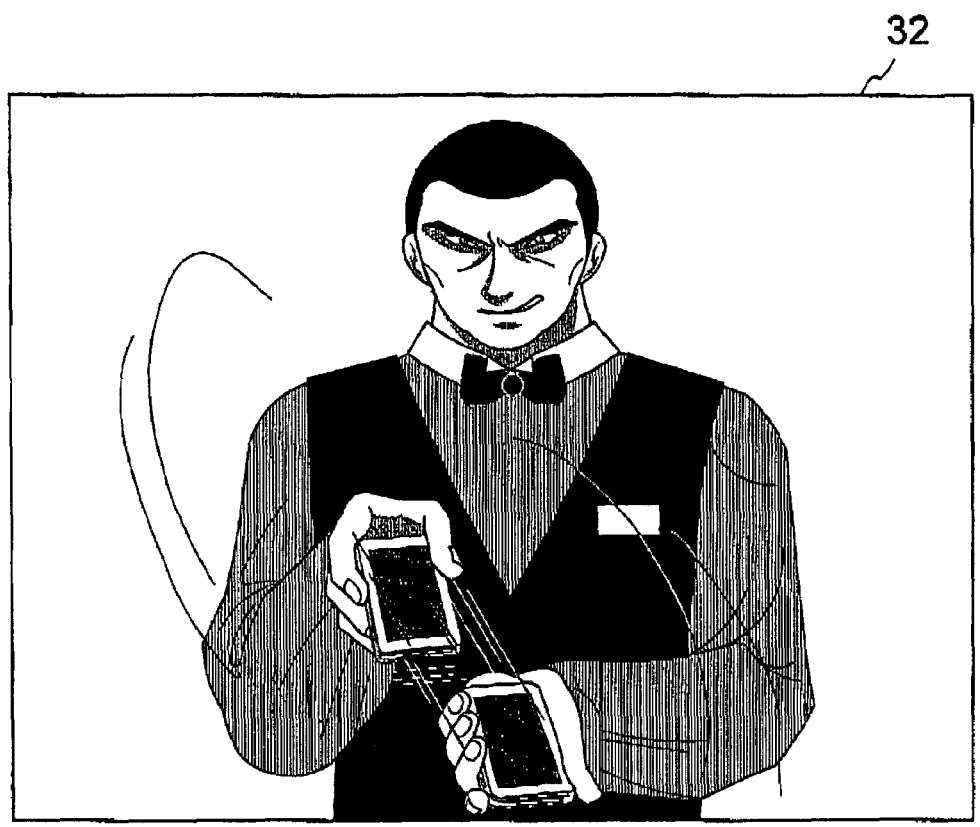
FIG. 5 is a schematic view showing a screen display of the game machine according to this invention.

FIG. 5 shows a display example of an image that is displayed on display device 32 immediately after the start of the game, and FIGS. 6 through 9 show display examples of images displayed on display device 32 when cards are dealt. FIG. 10 shows a display example of an image displayed on display device 42, and FIG. 11 shows a display example of an image displayed on a display device 52. Furthermore, FIGS. 12A, 12B, and 13A through 13C show display examples of images displayed on display devices 32, 42, and 52.

As shown in FIG. 5, a dealer image is displayed on display device 32. This dealer image deals cards to the respective players.

Figure 6:
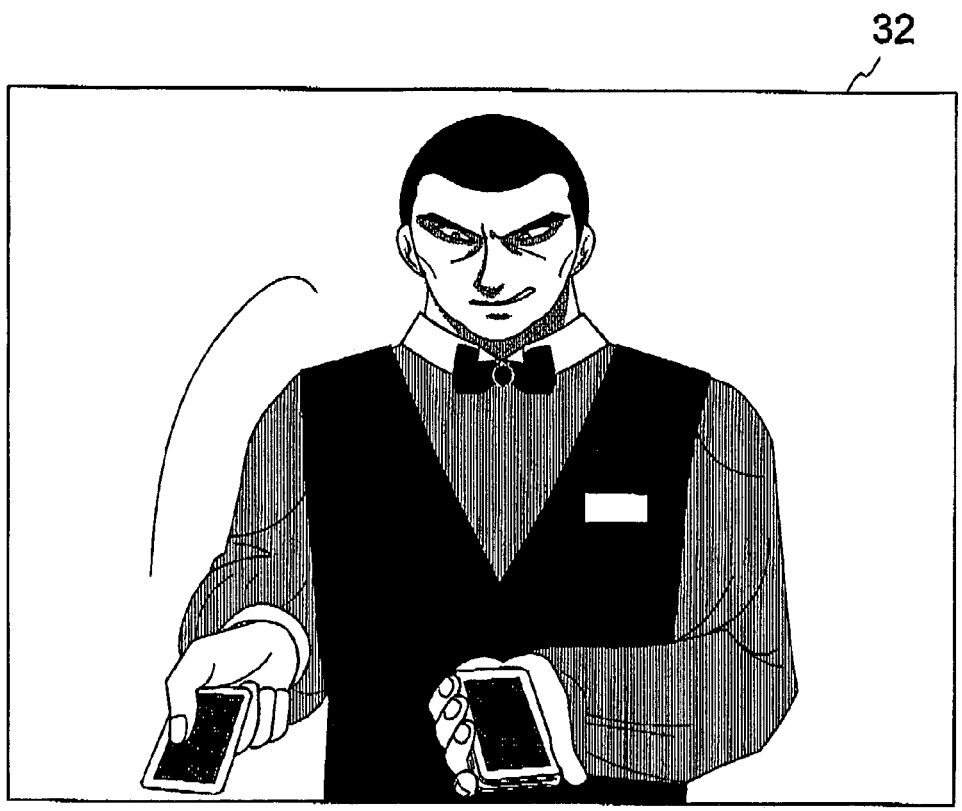
FIG. 6 is a schematic view showing a screen display of the game machine according to this invention.
Figure 7:
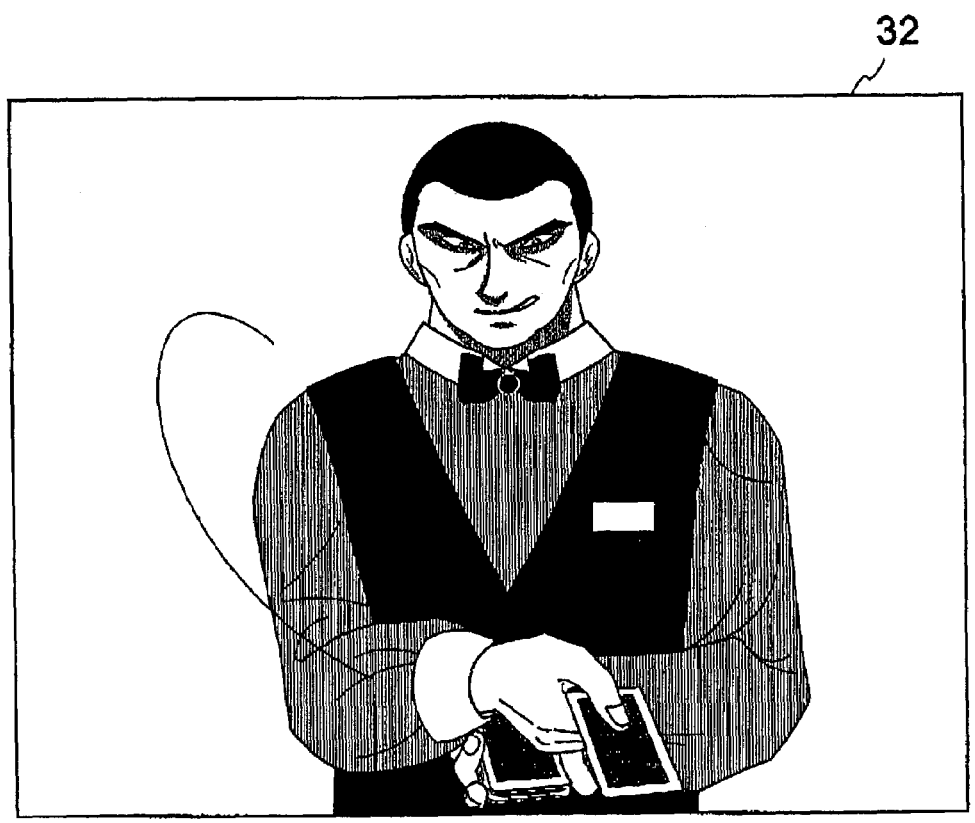
FIG. 7 is a schematic view showing a screen display of the game machine according to this invention.

As shown in FIG. 6, the dealer image is displayed so as if to deal a card as shown in FIG. 6. This dealer image is displayed so that the eye line, posture, direction of extension of a hand, etc., are changed in the direction a card is dealt to, and when a card is dealt to display device 52B, the image is displayed so that the card is dealt diagonally to the left front side as viewed from the front as shown in FIG. 6, when a card is dealt to display device 52C, the image is displayed so that the card is dealt diagonally to the right front side as viewed from the front as shown in FIG. 7, when a card is dealt to display device 52A, the image is displayed so that the card is dealt to the left side as viewed from the front as shown in FIG. 8, and when a card is dealt to display device 52D, the image is displayed so that the card is dealt to the right side as viewed from the front as shown in FIG. 9.

Thus since "when the dealing of a card is performed, the dealer image is displayed on the above-mentioned common display part in a manner such that the dealer image faces the direction of the position at which the above-mentioned individual display part to which the card is dealt is installed," even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of increasing the possibility of making players become immersed in the game is increased. Needless to say, a realistic game can be enjoyed by both players to whom a card is not dealt and the player to whom the card is dealt, Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games.

"The dealer image may be displayed in a manner such that, when a card is dealt, a hand of the dealer is positioned in the direction in which an above-mentioned individual display part to which the card is dealt is installed," and with such an arrangement, an even more realistic game can be provided and players can be provided with the enjoyment of the tactical interaction that is characteristic of card games.

Also, as shown in FIG. 10, images of the dealt cards are displayed on display device 42. With these card images, in a state where a card is not dealt, such as when the card is exchanged, prior to the dealing of the card, etc., the card is not displayed. Also, there will be no problem if images indicating the number of betted coins are displayed.

Furthermore, as shown in FIG. 11, images of the dealt cards and images of the players besides oneself are displayed on a display device 52. With these card images, in a state where a card is not dealt, such as when a card is exchanged or prior to the dealing of a card, etc., the card is not displayed. Also, there will be no problem if images indicating the number of betted coins or number of credits, etc., are displayed. With the player images, when players that are actually playing the game exist, player images taken by image taking device 44 are displayed, and in a case where false players who are not actually playing the game exist, images of these false players are displayed.

With these display devices 32, 42, and 52, images are displayed as shown in FIGS. 12A and 12B, and these images are displayed in a synchronized manner. For example, when in a process where as shown in FIGS. 12A and 12B, the dealer images extends a hand to deal a card, the hand part of the dealer image falls outside the display area of display device 32 as shown in FIGS. 13A and 13B, that is, when the dealer image is displayed with the exception of the hand of the dealer, the hand that is to be displayed outside the display area of display device 32 is displayed on display devices 42 and 52 so that it appears as if an actual dealer is dealing the card. Also, when a card is dealt, the card image indicating the dealt card is displayed facing downward on display device 42 and displayed facing upward on a display device 52 at the same time as the dealing process so that it appears as if an actual dealer is dealing the card, Furthermore, a player to whom the card is not dealt can clearly know the timing of the dealing of the card by viewing the corresponding image and enjoy the tactical interaction of observing the expression of the player to whom the card was dealt.

Since in some cases in making the dealer image be displayed on the above-mentioned common display part in a manner such that a card is dealt, the above-mentioned display control means thus makes the dealer displayed on the above-mentioned common display part be displayed in a manner such that a hand of the dealer image is erased and makes the hand of the dealer image be displayed on the above-mentioned individual display part to which the above-mentioned card is dealt, a player to whom a card is dealt is provided with a sensation of actually being dealt a card, thus providing a game that is even more realistic. Also, by providing an arrangement equipped with a held card display part, disposed at a position visible to the players, and arranging so that the above-mentioned display control means, in some cases in making the dealer image be displayed on the above-mentioned common display part in a manner such that the dealer image deals a card, makes the dealer image displayed on the above-mentioned common display part be displayed in a manner such that a hand of the dealer image is erased and makes the hand of the dealer image be displayed on the above-mentioned individual display part to which the above-mentioned card is dealt, a player to whom the card is not dealt can observe how the player to whom the card is dealt reacts upon visibly recognizing the card and can thus enjoy the tactical interaction that is characteristic of card games.

[Operation of the Game Machine]

Figure 14:
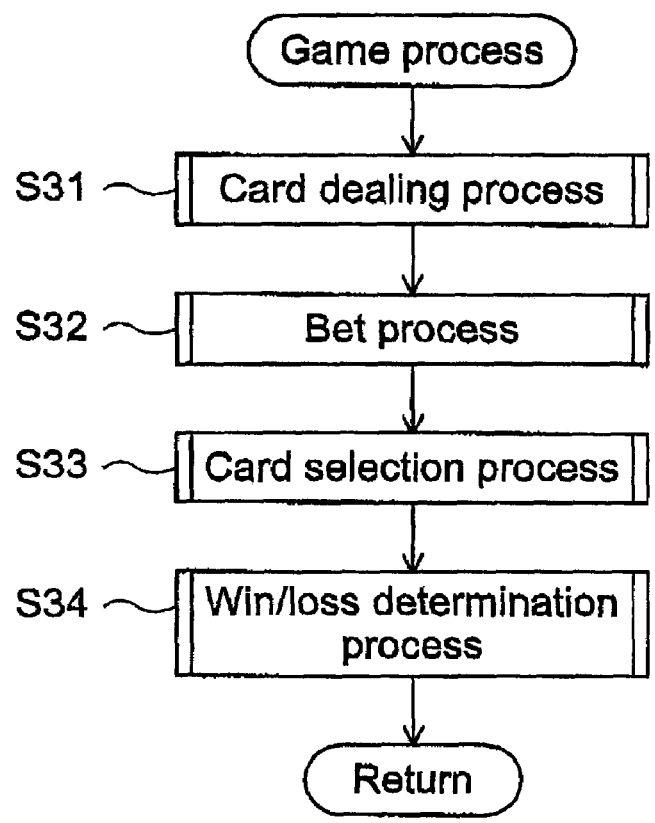
FIG. 14 is a flowchart of a control process executed by the game machine according to this invention.
Figure 15:
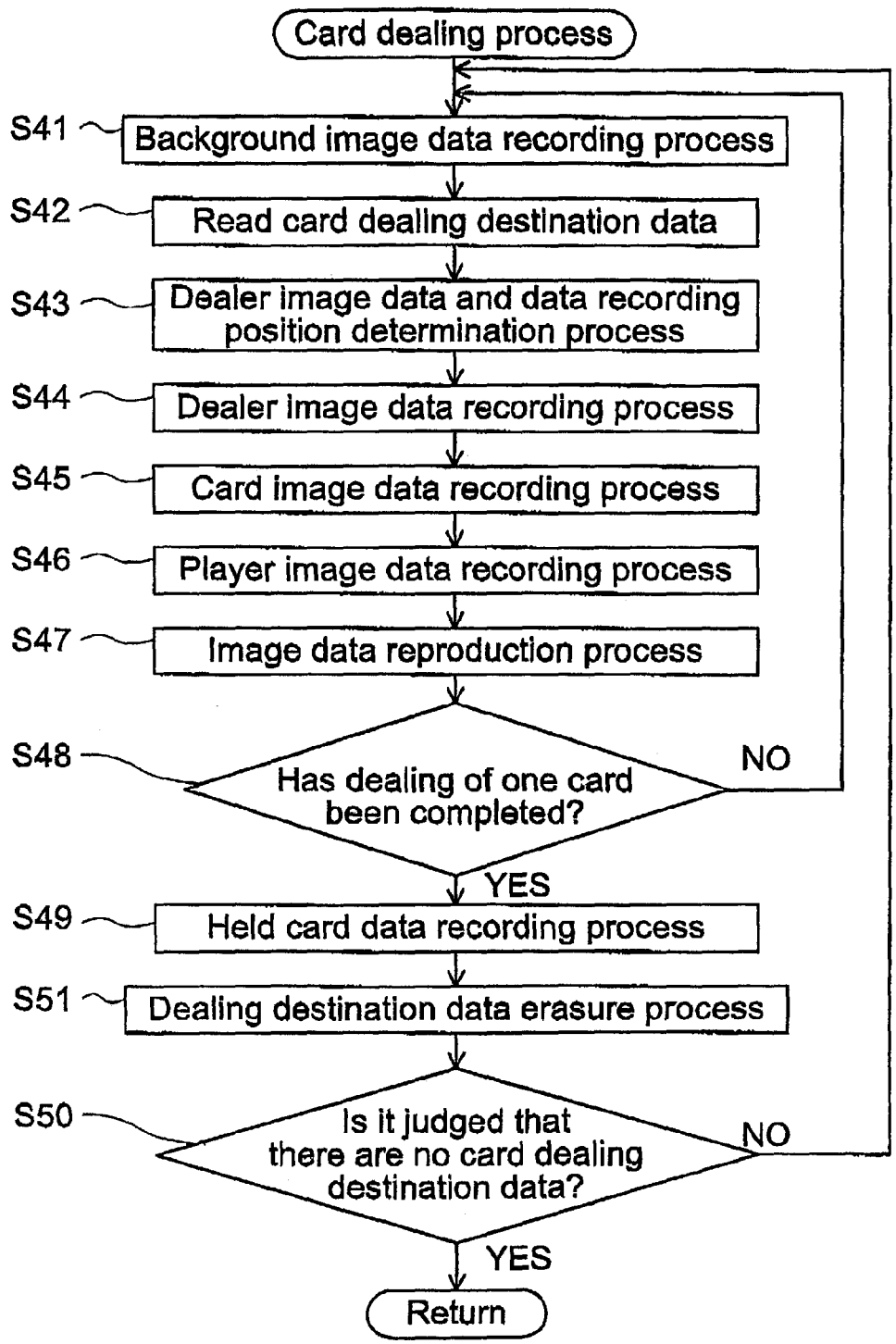
FIG. 15 is a flowchart of a control process executed by the game machine according to this invention.
Figure 16:
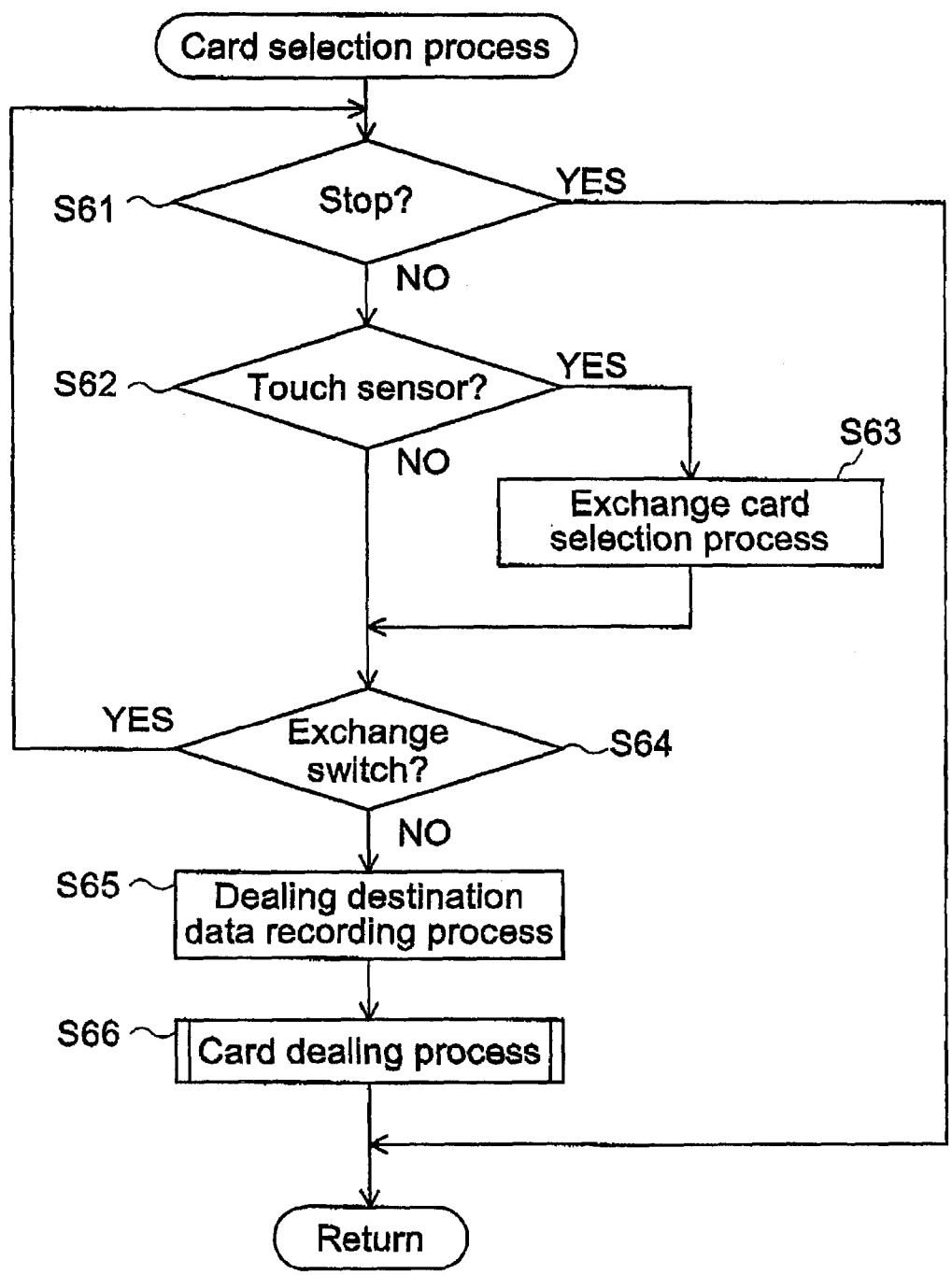
FIG. 16 is a flowchart of a control process executed by the game machine according to this invention.

Subroutines for controlling game machine 10, which are executed by the above-described main control circuit 60, are shown in FIGS. 14 through 16. The subroutine shown in FIG. 14 is called and executed at a predetermined timing from a main program of game machine 10 that is executed in advance.

In the following, it shall be deemed that game machine 10 has been started in advance, the variables used in the above-described CPU 66 are initialized to predetermined values, and steady-state operation is being carried out.

With the subroutine shown in FIG. 14, first a card dealing process is executed (step S31). In this process, CPU 66 makes an image of the dealing of a card be displayed based on dealing destination data recorded in RAM 70 as shall be described later and furthermore records the data indicating the dealt card in RAM 70. When this process is ended, a transfer to step S32 is performed.

Next, a bet process is executed (step S32). In this process, CPU 66 determines the number of medals to be betted based on the operation of bet switch 24 and other various operations by a player. When this process is ended, a transfer to step S33 is performed.

Next, a card selection process is executed (step S33). In this process, CPU 66 selects a card to be exchanged based on the operation of card exchange switch 26, touch sensor 28, and other various operations by a player as shall be described later and makes the image of the card to take the place of the selected card be displayed. When this process is ended, a transfer to step S34 is performed.

Next, a win/loss determination process is executed (step S34). In this process, CPU 66 reads held card data recorded in RAM 70, collates the data with the combination table recorded in ROM 68, determines the win or loss based on the results of collation, and disburses medals. When this process is ended the present subroutine is ended immediately.

In the card dealing process routine, which is called as mentioned above in step S31 or in step S66 to be described below, the subroutine shown in FIG. 15 is called and a process of recording the background image data is executed (step S41). In this process, CPU 66 supplies a background display instruction to display control device 200 via input/output bus 64 and interface circuit set 72. This instruction includes data indicating the background image data, data indicating the display positions of the background image data, etc. At display control device 200, CPU 206 receives the background display instruction and supplies the background display instruction to VDP 212 via interface circuit 202 and input/output bus 204. Upon receiving the background display instruction, VDP 212 reads the desired background image data from image data ROM 216 based on the respective data included in the instruction and records the data at desired positions in video RAM 214. When this process is ended, a transfer to step S42 is performed.

A card dealing data reading process is then executed (step S42). In this process, CPU 66 reads the dealing data that indicate the dealing destination recorded in advance in RAM 70 in accordance with various operation switches.

The dealing data are four-digit, hexadecimal data, with the lower two digits indicating the type of the card to be dealt that has been determined based on a priorly determined lottery result and the upper two digits indicate the position to which a card is dealt of the upper two digits of the dealing data, the numerical value of the upper digit indicates the display device 52 to which the card is dealt and the numerical value of the lower digit indicates the card dealing location in the display device 52 that is indicated by the upper digits.

Specifically, when a card indicating the "ace of spades" is to be dealt to the rightmost position in display device 52A, the data, "1511," is recorded. That is, when the uppermost digit is "1," it indicates display device 52A, when the uppermost digit is "2," it indicates display device 52B, when the uppermost digit is "3," it indicates display device 52C, and when the uppermost digit is "4," it indicates display device 52D. Also, when the second digit from the uppermost digit is "1," it indicates the leftmost position in display device 52A, when the second digit from the uppermost digit is "2," it indicates the second position from the left in display device 52A, when the second digit from the uppermost digit is "3," it indicates the central position in display device 52A, when the second digit from the uppermost digit is "4," it indicates the second position from the right in display device 52A, and when the second digit from the uppermost digit is "5," it indicates the rightmost position in display device 52A. Also, the second digit from the lowermost digit indicates the type of card, such as "spades," "clubs," etc., and is "1", when the card to be dealt is "spades," "2" when the card to be dealt is "clubs," "3" when the card to be dealt is "hearts," and "4" when the card to be dealt is "diamonds." Furthermore, the lowermost digit indicates the numeral of the card to be dealt, and when the numeral of the card is any of "1" to "9," the numerical value is used as it is, when the numeral of the card is "10," "A" is indicated, when the numeral of the card is "J," "B" is indicated, when the numeral of the card is "Q," "C" is indicated, and when the numeral of the card is "K," "D" is indicated.

A plurality of these data may be recorded in a cumulative manner and when the dealing of a card is ended, the dealing destination data indicating the position at which dealing was ended are erased. Thus in a game where there are four participants, since five cards are dealt to each player at first, 25 sets of data are recorded as dealing destination data in RAM 70. Also, when an exchange is performed by operation of a player, data indicating the position of the card to be exchanged is recorded as dealing destination data in RAM 70.

By reading the dealing destination data recorded in RAM 70, CPU 66 not only deals a card to the corresponding position but also selects dealer images to be displayed on display devices 32, 42, and 52 as shall be described below. When this process is ended, a transfer to step S43 is performed.

Next, a process of determining the dealer image data and the data recording position thereof is executed (step S43). In this process, CPU 66 determines the dealer image data recording position in video RAM 214 based on the dealing destination data read in the process of step S41. This process generates a character figure display instruction that includes the data indicating the type of character figure image data in accordance with the position to which a card is dealt and data indicating the position at which the character figure data are to be recorded.

That is, since the type of character figure image, which is the dealer, and the position at which the character figure image is to be displayed, etc., are determined based on the dealing destination data, the dealer, in other words, the character figure image data are recorded so that a card is dealt in the direction of one of display devices 52A to 52D. Also, the card is dealt with a hand of the dealer, in other words, the character figure data being directed in the direction of one of display devices 52A to 52D. When this process is ended, a transfer to step S44 is performed.

Next a dealer image data recording process is executed (step S44). In this process, CPU 66 supplies a character figure display instruction to display control device 200 via input/output bus 64 and interface circuit set 72. This instruction includes data indicating the character figure image data, data indicating the display position of the character figure image data, etc. At display control device 200, CPU 206 receives the character figure display instruction and supplies the character figure display instruction to VDP 212 via interface circuit 202 and input/output bus 204. Upon receiving the character figure display instruction, VDP 212 reads the desired character figure image data from image data ROM 216 based on the various data included in the instruction and records the data at a desired position in video RAM 214. When this process is ended, a transfer to step S45 is performed.

A card image data recording process is then executed (step S45). In this process, CPU 66 supplies a card display instruction to display control device 200 via input/output bus 64 and interface circuit set 72. This instruction includes data indicating the card image data, data indicating the display position of the card image data, etc. At display control device 200, CPU 206 receives the card display instruction and supplies the card display instruction to VDP 212 via interface circuit 202 and input/output bus 204. Upon receiving the card display instruction, VDP 212 reads the desired card image data from image data ROM 216 based on the various data included in the instruction and records the data at a desired position in video RAM 214. When this process is ended, a transfer to step S46 is performed.

A player image data recording process is then executed (step S46). In this process, CPU 66 receives imaged at a supplied from image taking device 44 via interface circuit set 62 and input/output bus 64 and records the data in RAM 70. In a case where a player is a false player who is not actually playing, data indicating the false player are recorded in RAM 70. CPU 66 then supplies a player display instruction to display control device 200 via input/output bus 64 and interface circuit set 72. This instruction includes player image data, false player image data, data indicating the display position of the player image data, etc. At display control device 200, CPU 206 receives the player display instruction and supplies the player display instruction to VDP 212 via interface circuit 202 and input/output bus 204. Upon receiving the player display instruction, VDP 212 records false player image data read from image data ROM 216 or player image data taken by image taking device 44 at a desired position in video RAM 214 based on the various data included in the instruction. When this process is ended, a transfer to step S47 is performed.

The image data set in video RAM 214 are then displayed (step S47). VDP 212 reads the image data recorded in video RAM 214 by the processes up to step S46 and supplies the image data to drive circuit 218. Upon receiving the image data, drive circuit 218 converts the image data to signals of predetermined form and supplies the signals to each of display devices 32, 42, and 52. Images, such as those shown in FIGS. 5 through 13C are thus made to be displayed on display devices 32, 42, and 52. When this process is ended, a transfer to step S48 is performed.

Whether or not the dealing of a single card has been completed is then judged (step S48). In this process, CPU 66 reads dealing completion data recorded in RAM 70, and if the dealing completion data is "00," that is, if it is judged that dealing has been completed, a transfer to step S48 is performed, and if the dealing completion data is "01," that is, if it is not judged that dealing has been completed, a transfer to step S41 is performed. Images of dealing a card is thus displayed continuously until the dealing of a single card is completed.

Also, in the process of step S43, the type of dealer image, the position at which the dealer image is to be displayed, etc., are determined based on the dealing destination data, and in this step, after making the dealer image immediately prior to dealing a card be displayed so that a hand of the dealer image will be outside the display range of display device 32, the hand of the dealer image is displayed on display devices 42 and 52.

A held card data recording process is then executed (step S49). In this process, CPU 66 reads, from among the dealing destination data recorded in RAM 70, the dealing destination data indicating the card that was judged as having been dealt in the judgment of step S48 and records the data as held card data positioned in RAM 70. The types of cards owned by the respective players can thus be identified. When this process is ended, a transfer to step S50 is performed.

A dealing destination data erasure process is then executed (step S50). In this process, CPU 66 erases, from among the dealing destination data recorded in RAM 70, the dealing destination data indicating the card that was judged as having been dealt in the judgment of step S48, that is, records data (for example, "FFFF," etc.) indicating empty data. When this process is ended, a transfer to step S51 is performed.

Next in step S51, whether there is no card dealing data is judged. In this process, CPU 66 reads the dealing destination data positioned in RAM 70 and judges whether there are no dealing destination data, that is, judges whether or not all of the dealing destination data are empty data (for example, "FFFF"). If CPU 66 judges all of the dealing destination data to be empty data, that is, judges that there are no dealing destination data, the present subroutine is ended immediately, while if it is judged that not all of the dealing destination data are empty data, that is, if it is not judged that there are no dealing destination data, a transfer to step S41 is performed. The present subroutine is thus performed until all cards are dealt.

As mentioned above, in the card dealing process routine called in step S33, the subroutine shown in FIG. 16 is called and whether or not stop switch 30 has been operated is judged (step S61). In this process, if stop switch 30 is operated by a player, stop switch 30 supplies a stop signal to interface circuit set 62. Then when CPU 66 judges that the stop signal supplied from stop switch 30 has been received as stop data via interface circuit set 62 and input/output bus 64, the present routine is ended, and if it is not judged that the stop signal has been received as stop data, a transfer to step S62 is performed.

Next, whether or not an operation of touch sensor 28 has been performed is judged (step S62). In this process, if a process position of touch sensor 28 has been touched by a player, touch sensor 28 supplies a touch detection signal to interface circuit set 62. Then when CPU 66 judges that the touch detection signal supplied from touch sensor 28 has been received as touch detection data via interface circuit set 62 and input/output bus 64, a transfer to step S63 is performed, and if it is not judged that the touch detection signal has been received as touch detection data, a transfer to step S64 is performed.

Next in step S63, an exchange card selection process is executed. In this process, CPU 66 records exchanged card data, indicating the detection of selection of a certain card image by the process of step S62, in RAM 70. When this process is ended, a transfer to step S64 is performed.

Next in step S64, whether or not card exchange switch 26 has been operated is judged. In this process, if card exchange switch 26 is operated by a player, card exchange switch 26 supplies a card exchange signal to interface circuit set 62. Then when CPU 66 judges that the card exchange signal supplied from card exchange switch 26 has been received as card exchange data via interface circuit set 62 and input/output bus 64 and the exchanged card data are recorded, a transfer to step S65 is performed, and if it is not judged that the card exchange signal has been received as card exchange data or if it is not judged that exchanged card data are recorded, a transfer to step S61 is performed. The card dealing process is thus started if even one exchanged card data has been recorded and card exchange 26 is operated.

Next in step S65, a dealing destination data recording process is executed. In this process, CPU 66 makes a random number be generated based on the exchanged card data recorded in RAM 70 by the process of step S63 and generates dealing destination data. In particular, for the lower two digits, dealing destination data indicating the data to be dealt are recorded in RAM 70. When this process is ended, a transfer to step S66 is performed.

Next, the card dealing process is executed (step S66). In this process, CPU 66 reads the dealing destination data recorded in RAM 70 in step S65 and deals a card based on the dealing destination data. When this process is ended, the present subroutine is ended immediately.

Since by thus performing the above-described processes of step S42 to step S44, the above-mentioned display control means makes, when the dealing of a card is performed, the dealer image be displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of increasing the possibility of making players become immersed in the game is increased. Needless to say, a realistic game can be enjoyed by both players to whom a card is not dealt and the player to whom the card is dealt. Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games, The dealer image may be displayed in a manner such that, when a card is dealt, a hand of the dealer is positioned in the direction in which an above-mentioned individual display part to which the card is dealt is installed, and with such an arrangement, an even more realistic game can be provided and players can be provided with the enjoyment of the tactical interaction that is characteristic of card games.

Also, by performing the above-described processes of step S42 to step S44, since, "when the dealing of a card is performed, the dealer image is displayed on the above-mentioned common display part in a manner such that the dealer image faces the direction in which the above-mentioned individual display part to which the card is dealt is installed," even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of increasing the possibility of making players become immersed in the game is increased. Needless to say, a realistic game can be enjoyed by both players to whom a card is not dealt and the player to whom the card is dealt. Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games.

The dealer image may be displayed in a manner such that, when a card is dealt, a hand of the dealer is positioned in the direction in which an above-mentioned individual display part to which the card is dealt is installed, and with such an arrangement, an even more realistic game can be provided and players can be provided with the enjoyment of the tactical interaction that is characteristic of card games.

Furthermore, by performing the above-described processes of step S42 to step S44, since in some cases in making the dealer image be displayed on the above-mentioned common display part above-mentioned display control means makes the dealer displayed on the above-mentioned common display part be displayed in a manner such that a hand of the dealer image is erased and makes the hand of the dealer image be displayed on the above-mentioned individual display part to which the above-mentioned card is dealt, a player to whom a card is dealt is provided with a sensation of actually being dealt a card, thus providing a game that is even more realistic.

Also, by providing an arrangement equipped with a held card display part, disposed at a position visible to the players, and arranging so that the above-mentioned display control means, in some cases in making the dealer image be displayed on the above-mentioned common display part in a manner such that the dealer image deals a card, makes the dealer image displayed on the above-mentioned common display part be displayed in a manner such that a hand of the dealer image is erased and makes the hand of the dealer image be displayed on the above-mentioned individual display part to which the above-mentioned card is dealt, a player to whom the card is not dealt can observe how the player to whom the card is dealt reacts upon visibly recognizing the card and can thus enjoy the tactical interaction that is characteristic of card games.

Besides providing such a game machine, this invention may also be provided in the form of a server and a program.

Though the present embodiment is a game machine 10 equipped with display devices 32, 42, and 52 that display two-dimensional images, the present invention is not limited thereto, and the game machine may have an arrangement equipped with display devices 32, 42, and 52 that display three-dimensional images.

[Arrangement Including a Server]

Figure 17:
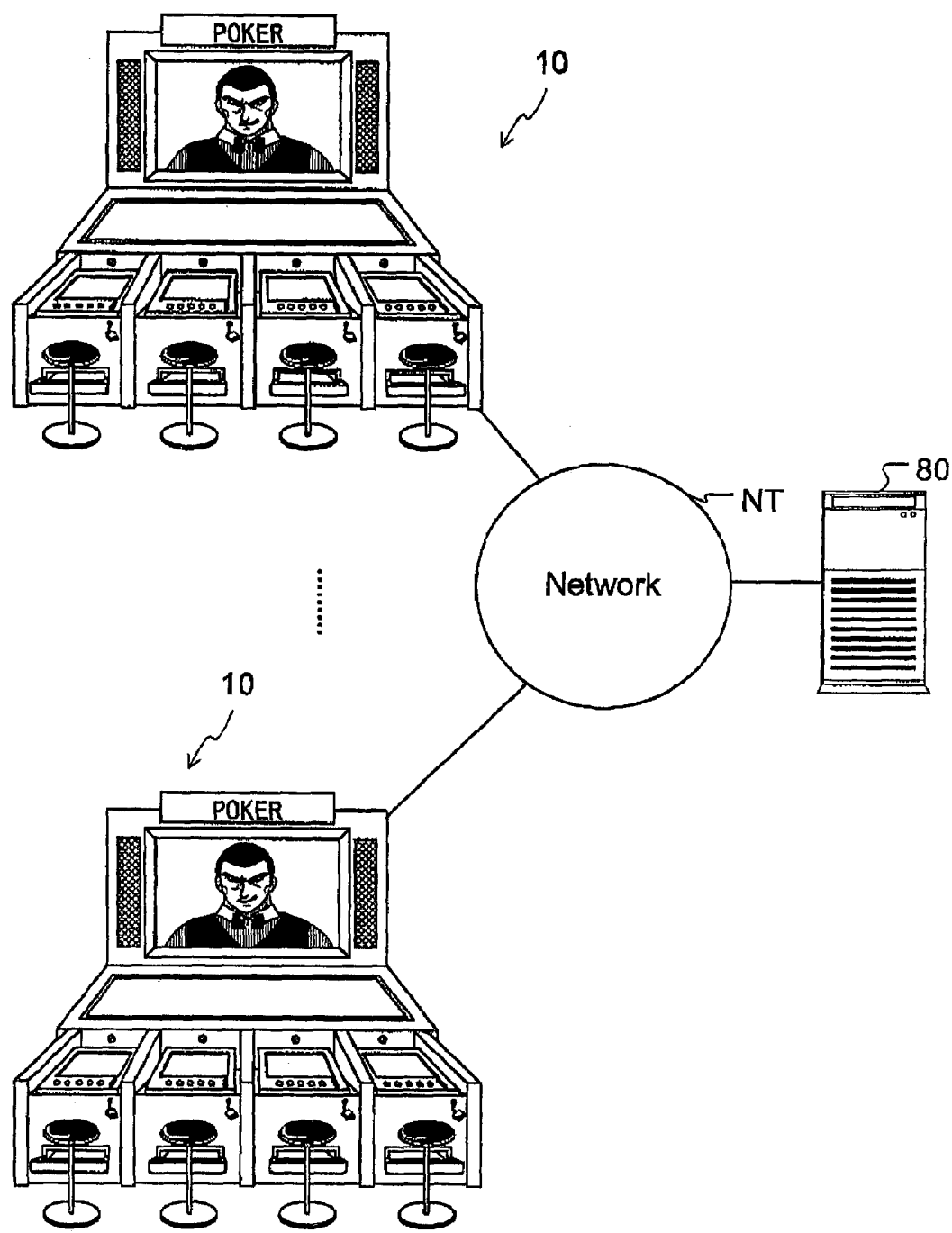
FIG. 17 is a diagram illustrating an outline of a case where a server and game machines are connected via a network.

Though the above-described embodiment is arranged from just game machine 10, an arrangement in which a server 80 and game machines 10 are connected as shown in FIG. 17 is also possible. Specifically, server 80 may be arranged to make game machines 10 display dealer images, card images, etc., based on operations of players at game machines 10 and thereby make a game proceed.

That is, server 80 controls game machines 10, and has a function of making, when the dealing of a card is performed, the dealer image be displayed on the common display part of an above-mentioned game machine in a manner such that the dealer image faces the direction in which the above-mentioned individual display part to which the card is dealt is installed.

With this arrangement, since when the dealing of a card is performed, the dealer image is displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, even with a game provided by a game machine, a realistic game that provides the sensation that a card is actually being dealt can be provided and the possibility of increasing the possibility of making players become immersed in the game is increased. Needless to say, a realistic game can be enjoyed by both players to whom a card is not dealt and the player to whom the card is dealt. Also, virtual players controlled by a computer may be included among the players.

Furthermore, among such card games, the arrangement is effective especially for a card game, such as a poker game, etc., with which the game progresses without letting not even a single card among one's hand be seen by other players, and a realistic game can be provided that enables even players to whom a card is not dealt to recognize more readily to which player the card is dealt and when the card is dealt and to enjoy the tactical interaction that is characteristic of card games.

Furthermore, the possibility of centralized control of game machines from a remote location is provided, and the above-mentioned effects can be obtained without having to perform setting and other troublesome tasks for each of the game machines.

The dealer image may be displayed in a manner such that, when a card is dealt, a hand of the dealer is positioned in the direction in which an above-mentioned individual display part to which the card is dealt is installed, and with such an arrangement, an even more realistic game can be provided and players can be provided with the enjoyment of the tactical interaction that is characteristic of card games.

With this invention, since when the dealing of a card is performed, the above-mentioned display control means makes the dealer image be displayed on the above-mentioned common display part in a manner such that the dealer image faces the direction in which the above-mentioned individual display part to which the card is dealt is installed, even a player to whom the card is not dealt can readily recognize to which player the card is being dealt and when the card is dealt and can thus enjoy the tactical interaction that is characteristic of card games.

Also, the game machine can provide a realistic game in which a card seems to be actually dealt. Both a player to whom a card is not dealt and a player to whom a card is dealt can enjoy a realistic game.

What is claimed is:

1. A game machine, with which images of a card game using cards dealt by a dealer are displayable, said game machine comprising:
   a common display device, for displaying a dealer image of a dealer who deals cards;
   a plurality of individual display devices, each being positioned opposite to said common display device, for displaying images of cards; and
   a display control device, for controlling said common display device and said individual display devices in correlation with respective positions of said individual display devices,
   wherein when dealing of each of said cards is performed, said display control device controls said common display device so as to display a dealer image without a hand part, and controls a particular one of the individual display devices to which a card is dealt so as to display the hand part of said dealer image.

2. The game machine as set forth in claim 1, wherein when dealing of each of said cards is performed, said display control device controls said common display device so as to display a dealer image in which the dealer faces a position of a particular one of the individual display devices, to which a card is dealt.

3. The game machine as set forth in claim 1, wherein when dealing of each of said cards is performed, said display control device controls said common display device so as to display a dealer image in which an arm part of the dealer image is positioned in a direction of a particular one of the individual display devices, to which a card is dealt.

4. The game machine as set forth in claim 1, further comprising:
a plurality of connectors for portable terminal devices used by the players.

5. The game machine as set forth in claim 1, wherein said display control device performs control so as to display a single video image with said common display device and said individual display devices.

6. The game machine as set forth in claim 1, further comprising:
a disbursement device for performing disbursement of game currencies that are loaded by players and provided to players in accordance with results of said card game.

7. The game machine as set forth in claim 1, wherein said individual display devices are positioned in an aligned manner.

8. The game machine as set forth in claim 1, further comprising:
another display device for displaying said cards, located between said individual display devices and said common display device.

9. The game machine as set forth in claim 1, wherein said dealer image is a moving image.

10. The game machine as set forth in claim 1, wherein said card game is a poker game.

11. The game machine as set forth in claim 1, further comprising:
an image taking device configured to take and transmit images of players to said individual display devices.

12. A networked system, comprising:
a plurality of game machines, each of which for displaying images of a card game using cards and including (i) a common display device, for displaying a dealer image of a dealer who deals cards, and (ii) a plurality of individual display devices, each being positioned opposite to said common display device and for displaying images of cards; and
a server, connected to the plurality of name machines, for controlling said common display device and said individual display devices;
wherein the server performs control such that (i) a dealer image of a dealer facing the position of a particular one of the individual display devices to which a card is dealt, is displayed on said common display device, and (ii) when dealing of each of said cards is performed, said common display device displays said dealer image without a hand part, and said particular one individual display device to which the card is dealt displays the hand part of said dealer image.

13. A game machine comprising:
a common display device which displays images commonly observed by a plurality of players;
a plurality of individual display devices which are independently observed by the respective players;
a display controller which controls the common display device and the individual display devices;
a game controller which starts to conduct a card game in response to a bet and deals cards to the respective players; and
a storage device which stores a set of dealer image data including a plurality of dealer images of a dealer dealing cards in the card game, and information and image data for the card game, and a plurality of destinations for cards corresponding to the respective individual display devices;
wherein when the game controller deals cards to each player during the card game, the game controller reads out a destination for a card from the storage device;
wherein the display controller reads out, from the storage device, first dealer image data associated with the destination for the card read out by the game controller, and controls the common display device to display a first dealer image according to the destination for the card read out by the game controller and to the first dealer image data read out by the display controller;
wherein the display controller reads out, from the storage device, second dealer image data for an individual display device, which corresponds to the first dealer image data read out by the display controller, and controls the individual display device to display a second dealer image according to the second dealer image data read out by the display controller, and gaming images according to the stored information and image data;
wherein the display controller controls the common display device and the individual display device so that the displayed second dealer image and the displayed gaming images are synchronized with the displayed first dealer image.

14. The game machine as set forth in claim 13, wherein:
the display controller has a common display area corresponding to a display area of the common display device, and an individual display area corresponding to a display area of each individual display device;
the display controller generates image data including images which are spaced at predetermined intervals so as to be displayed in the common display area and the individual display area, and
the display controller controls the common display device to display an image displayed in the common display area, in the display area of the common display device, and controls the individual display devices to display images displayed in the individual area, in the display area of each individual display.

15. A method of controlling presentation of images to real players of a card game played using images of virtual cards dealt to real players by a virtual dealer, comprising:
displaying, simultaneously to all the real players of the card game, dealer images of the virtual dealer who deals the virtual cards;
displaying images of the virtual cards dealt to each of the real players, to only the real player to whom those virtual cards are dealt; and
when dealing of each of the virtual cards is performed by the virtual dealer, controlling the display of the dealer images such that an image of the virtual dealer without a hand part is displayed, and simultaneously displaying a separate image of the hand part of the virtual dealer to a particular one of the real players to whom the virtual card is dealt.

16. The method as set forth in claim 15, further comprising:
simultaneously displaying images of virtual cards played, to all the real players of the card game.

17. The method as set forth in claim 15, further comprising:
displaying images of a real player to other real players.

18. The method as set forth in claim 15, further comprising:

when dealing of each of said virtual cards is performed by the virtual dealer, also controlling the display of the dealer images such that the virtual dealer faces a position of the particular one real player to whom the virtual card is dealt.

19. The method as set forth in claim 15, further comprising:

when dealing of each of said virtual cards is performed by the virtual dealer, also controlling the display of the dealer images such that an arm part of the virtual dealer is positioned in a direction of the particular one real player to whom the virtual card is dealt.

* * * * *